United States Patent
Ohno et al.

(10) Patent No.: US 6,723,410 B2
(45) Date of Patent: Apr. 20, 2004

(54) OPTICAL RECORDING MEDIUM

(75) Inventors: Takashi Ohno, Kanagawa (JP); Kenjiro Kiyono, Kanagawa (JP); Michikazu Horie, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 123 days.

(21) Appl. No.: 10/077,297

(22) Filed: Feb. 19, 2002

(65) Prior Publication Data

US 2002/0114915 A1 Aug. 22, 2002

Related U.S. Application Data

(63) Continuation of application No. PCT/JP01/04972, filed on Jun. 16, 2000.

(30) Foreign Application Priority Data

Jun. 16, 2000 (JP) ........................................ 2000-180701

(51) Int. Cl.$^7$ ................................................ B32B 3/02
(52) U.S. Cl. .................... 428/64.1; 428/64.5; 428/64.6; 430/270.13
(58) Field of Search ............................... 428/64.1, 64.4, 428/64.5, 64.6, 913; 430/270.13, 495.1, 945; 369/275.5, 283, 288

(56) References Cited

U.S. PATENT DOCUMENTS

| 4,839,207 A | 6/1989 | Yoshitomi et al. |
| 5,242,784 A | 9/1993 | Chen et al. |

(List continued on next page.)

FOREIGN PATENT DOCUMENTS

| EP | 834874 A2 | 4/1998 |
| EP | 945860 A2 | 9/1999 |
| JP | A-4-229429 | 8/1992 |
| JP | A-5-242531 | 9/1993 |
| JP | A-7-078354 | 3/1995 |
| JP | A-7-105574 | 4/1995 |
| JP | 2000-79761 A | 3/2000 |
| JP | 2000-113505 A | 4/2000 |
| WO | WO 00/14735 A1 | 3/2000 |
| WO | WO 00/25308 A1 | 5/2000 |

OTHER PUBLICATIONS

U.S. patent application Ser. No. 10/077,297, Ohno et al., filed Feb. 19, 2002.

(List continued on next page.)

*Primary Examiner*—Elizabeth Mulvaney
(74) *Attorney, Agent, or Firm*—Oblon, Spivak, McClelland, Maier & Neustadt, P.C.

(57) ABSTRACT

The subject matter of the invention is to provide an optical recording medium with improvements in repeated overwrite characteristics, write power margin, archival stability and the like.

The invention provides an optical recording medium having a semi-transparent layer mainly comprising Ag, a first protective layer comprising a dielectric, a phase-change recording layer comprising an alloy mainly comprising $Sb_xTe_{1-x}$ ($0.7 < x \leq 0.9$), a second protective layer comprising a dielectric, and a metallic reflective layer in this order, wherein the medium further has an interdiffusion-protection layer between the semi-transparent layer and the first protective layer where the first protective layer comprises a sulfur-containing dielectric, and the medium has a higher reflectance to light incident on the semi-transparent layer side with the recording layer being in an amorphous state than in a crystalline state.

17 Claims, 23 Drawing Sheets

U.S. PATENT DOCUMENTS

| | | | |
|---|---|---|---|
| 5,419,937 A | | 5/1995 | Coombs et al. |
| 5,431,978 A | * | 7/1995 | Nakamura et al. ......... 428/64.1 |
| 5,848,043 A | | 12/1998 | Takada et al. |
| 5,862,123 A | | 1/1999 | Horie et al. |
| 6,004,646 A | | 12/1999 | Ohno et al. |
| 6,071,588 A | * | 6/2000 | Nobumasa et al. ........ 428/64.4 |
| 6,108,295 A | | 8/2000 | Ohno et al. |
| 6,115,352 A | | 9/2000 | Ohno et al. |
| 6,115,353 A | | 9/2000 | Horie et al. |
| 6,128,273 A | | 10/2000 | Horie et al. |
| 6,143,468 A | | 11/2000 | Ohno et al. |
| 6,177,166 B1 | | 1/2001 | Ohno et al. |
| 6,294,310 B1 | | 9/2001 | Ohno et al. |
| 6,312,780 B1 | * | 11/2001 | Kasami ..................... 428/64.1 |
| 2003/0081537 A1 | * | 5/2003 | Shinotsuka .............. 369/275.4 |

OTHER PUBLICATIONS

U.S. patent application Ser. No. 10/378,990, Horie et al., filed Mar. 5, 2003.

U.S. patent application Ser. No. 09/530,599, Pending, filed May, 9, 2000.

U.S. patent application Ser. No. 09/842,035, Pending, filed Apr. 26, 2001.

U.S. patent application Ser. No. 09/918,487, Pending, filed Aug. 1, 2001.

* cited by examiner

OPTICAL RECORDING MEDIUM

TECHNICAL FIELD

This invention relates to a high-density rewritable optical recording medium and, more particularly, to a phase-change type recording medium having excellent performance in reduced recording signal jitter, wide write power margin, durability against characteristics deterioration by repeated overwriting, archival stability, and the like.

BACKGROUND ART

Media which are rewritable and interchangeable with compact discs, such as CD-RWs, have already spread. Media rewritable and interchangeable with DVDs, such as DVD-RWs, DVD+RWs, and DVD-RAMs, have now been prevailing. These phase-change optical discs are inexpensive large-capacity recording media excellent in portability, weatherability, impact resistance and the like.

The phase-change optical recording media accomplish writing and erasing by making use of changes in reflectance with reversible changes of the crystalline state. In general, a crystalline state is used as a non-recorded or erased state, where amorphous marks are formed for writing. A recording layer is usually crystallized by heating and keeping around the crystallization temperature for a given time and made into an amorphous phase by heating to a temperature higher than the melting point followed by quenching. As is understood from the difference in heating temperature, a crystalline phase is generally more stable.

Chalcogen alloys, such as GeSbTe alloys, InSbTe alloys, GeSnTe alloys, and AgInSbTe alloys, are of frequent use as a recording layer. These alloys are materials capable of overwriting.

In particular pseudo-binary alloys composed of $Sb_2Te_3$ and GeTe (hereinafter simply referred to as pseudo-binary alloys) and alloys having a composition near to an $Sb_{70}Te_{30}$ eutectic composition as a main component are known.

They are stable in both the crystalline state and the amorphous state and show phase transition between the two states relatively rapidly. They also have a advantage that segregation hardly occurs in repetition of overwriting. Accordingly, they have been put to practical use as a recording layer of phase-change optical discs.

The term "overwrite (direct overwrite)" denotes a recording mode in which when information is recorded on a medium having information already recorded information is recorded thereon without erasing the existing information before recording, i.e., a mode of recording while erasing the existing information. Since phase-change media usually accomplish recording in an overwrite mode, "overwrite" can be simply "record".

Of the alloys having a composition near to the $Sb_{70}Te_{30}$ eutectic composition as a main component, those containing Sb in excess over the $Sb_{70}Te_{30}$ eutectic composition (hereinafter simply referred to as an eutectic alloy systems) are attracting attention recently. A recording layer made of this type of alloys forms amorphous marks with smooth edges (mark edges) which are effective in suppressing jitter, and shows an extremely high crystallization rate so that it is capable of high-speed overwriting.

A phase-change recording medium is in general a so-called high-to-low medium, which has a lower reflectance after recording than before recording. Because a crystalline state is usually utilized as a non-recorded or erased state, and an amorphous state as a recorded state, the recording layer has a lower reflectance in an amorphous state than in a crystalline state. A high-to-low medium typically has a layer structure composed of a first protective layer, a recording layer, a second protective layer, and a reflective layer.

On the other hand, so-called low-to-high media which have a higher reflectance after recording than before recording are also known. Recording media of this type have a high reflectance when the recording layer is in an amorphous state than when the recording layer is in a crystalline state.

As for the low-to-high media, a layer structure composed of a semi-transparent layer mainly comprising metal, a first protective layer having a dielectric substance, a recording layer, a second protective layer having a dielectric substance, and a metallic reflective layer in this order is known. It is generally said that the low-to-high media having such a layer structure are capable of reducing a cross-erase phenomenon as compared with the high-to-low media.

Utility of the low-to-high media in media having a pseudo-binary alloy system recording layer is known. For example, where an alloy near to $Ge_2Sb_2Te_5$, which is a typical example of the pseudo-binary alloy system, is used as a recording layer, it is accepted that erasing unevenness due to difference in light absorption between amorphous areas and crystalline areas is eliminated to make high-speed overwriting possible.

However, utility of the low-to-high media having the above-described layer structure in media having an eutectic alloy system recording layer has not been made clear.

There have not been data indicating that application to the low-to-high media is effective on reduction of cross-erase. Since the eutectic alloy system recording layer essentially enables high-speed overwriting, contribution to the low-to-high media in this respect is not clear, either.

It has rather been observed that application to the low-to-high media can result in considerable reductions in archival stability or repeated overwrite characteristics. While some reduction of repeated overwrite characteristics is also observed with the high-to-low media, the degree of reduction occurring in the low-to-high media is higher.

That is, a general conventional layer structure for the low-to-high media has not succeeded in attaining excellent characteristics when using an eutectic alloy system recording layer.

DISCLOSURE OF THE INVENTION

The inventors have extensively studied on the problems associated with low-to-high media having an eutectic alloy system recording layer. As a result, they have found that a specific combination of layer structure design and material selection for each layer makes it possible for the first time to provide a medium with excellent characteristics and proved this medium superior to general high-to-low media in repeated overwrite characteristics or write power margin. The present invention has been completed based on these findings.

The gist of the present invention consists in an optical recording medium having a semi-transparent layer mainly comprising Ag, a first protective layer comprising a dielectric, a phase-change recording layer made of an alloy mainly comprising $Sb_xTe_{1-x}$ (0.7<x≦0.9), a second protective layer comprising a dielectric, and a metallic reflective layer in this order, which is characterized in that, where the first protective layer comprises a sulfur-containing dielectric, the medium further has an interdiffusion-protection layer between the semi-transparent layer and the first protective layer and that the medium has a higher reflectance to light incident on the semi-transparent layer side with the recording layer being in an amorphous state than with the recording layer being in a crystalline state.

Another gist of the present invention consists in an optical recording medium having a semi-transparent layer mainly comprising Ag, a first protective layer comprising a dielectric, a phase-change recording layer, a second protective layer comprising a dielectric, and a metallic reflective layer in this order, which is characterized in that crystallization in the recording layer proceeds chiefly through crystalline growth from the boundaries between amorphous or molten areas and crystalline areas, that the medium further has an interdiffusion-protection layer between the semi-transparent layer and the first protective layer where the first protective layer comprises sulfur, and that the medium has a higher reflectance to light incident on the semi-transparent layer side with the recording layer being in an amorphous state than with the recording layer being in a crystalline state.

In FIGS., numeral 1 indicates a semi-transparent layer; 2, a first protective layer; 3, a phase-change recording layer; 4, a second protective layer; 5, a metallic reflective layer; 6 and 8, a substrate; 7, a cover layer (a transparent coating layer); 9, a protective coating layer; and 11 and 12, an interdiffusion-protection layer.

BEST MODE FOR CARRYING OUT THE INVENTION

The present invention will be described hereunder in detail.

The optical recording medium of the invention has a layer structure comprising a semi-transparent layer mainly comprising Ag, a first protective layer comprising a dielectric, a phase-change recording layer made of an alloy mainly comprising $Sb_xTe_{1-x}$ ($0.7<x\leq0.9$), a second protective layer comprising a dielectric, and a metallic reflective layer in this order. Where the first protective layer comprises a sulfur-containing dielectric, an interdiffusion-protection layer is provided between the semi-transparent layer and the first protective layer.

The medium is of the type in which light is incident on the semi-transparent layer side to conduct writing and retrieving and is a low-to-high medium which has a higher reflectance when the recording layer is in an amorphous state than in a crystalline state. The term "reflectance" as used herein means the reflectance at a wavelength of writing/retrieving light.

Figure 1:
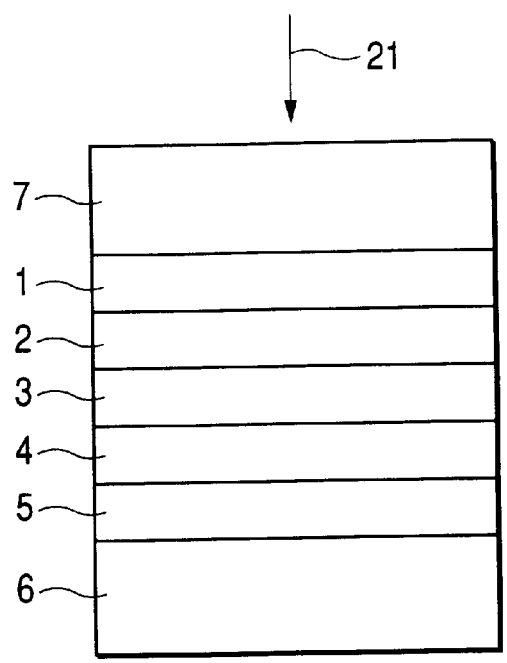
FIG. 1 is an example of the layer structure of the optical recording medium according to the invention.
Figure 2:
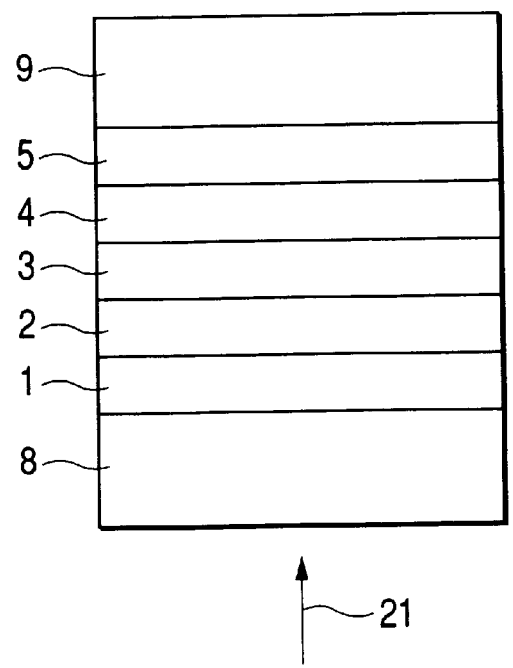
FIG. 2 is another example of the layer structure of the optical recording medium according to the invention.

Examples of the layer structure of the medium according to the invention are shown in FIGS. 1 and 2.

FIG. 1 shows an example having, on a substrate 6, a metallic reflective layer 5, a second protective layer 4, a phase-change recording layer 3, a first protective layer 2, a semi-transparent layer 1 mainly comprising Ag, and a cover layer (a transparent coating layer) 7 in this order, in which writing/retrieving light enters from the cover layer side. The cover layer (transparent coating layer) 7 is made of an ultraviolet-curing resin, a dielectric, a plastic, etc.

FIG. 2 is an example having, on a substrate 8, a semi-transparent layer 1 mainly comprising Ag, a first protective layer 2, a phase-change recording layer 3, a second protective layer 4, a metallic reflective layer 5, and a protective coating layer 9 in this order, in which writing/retrieving light enters from the substrate side. The protective coating layer 9 is made of an ultraviolet-curing resin, a dielectric, a plastic, etc. In what follows, the layer structure shown in FIG. 1 is called "film-side-incidence type", and that shown in FIG. 2 is called "substrate-incidence type".

Figure 3:
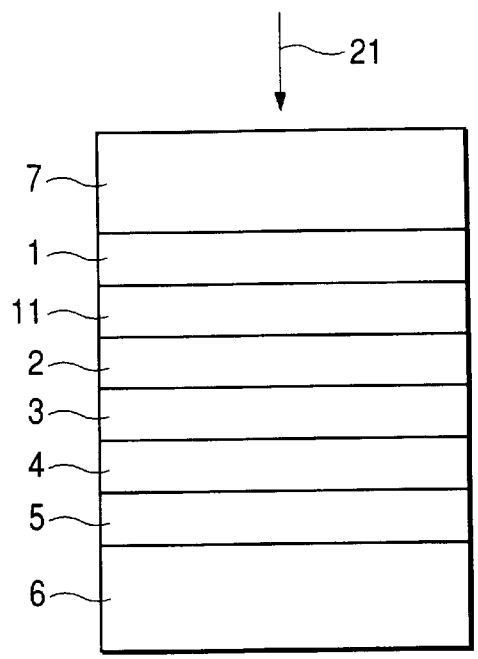
FIG. 3 is still another example of the layer structure of the optical recording medium according to the invention.

FIG. 3 represents a modification for the case where the first protective layer 2 comprises a sulfur-containing dielectric, in which an interdiffusion-protection layer 11 is disposed between the semi-transparent layer 1 mainly comprising Ag and the first protective layer 2.

Figure 4:
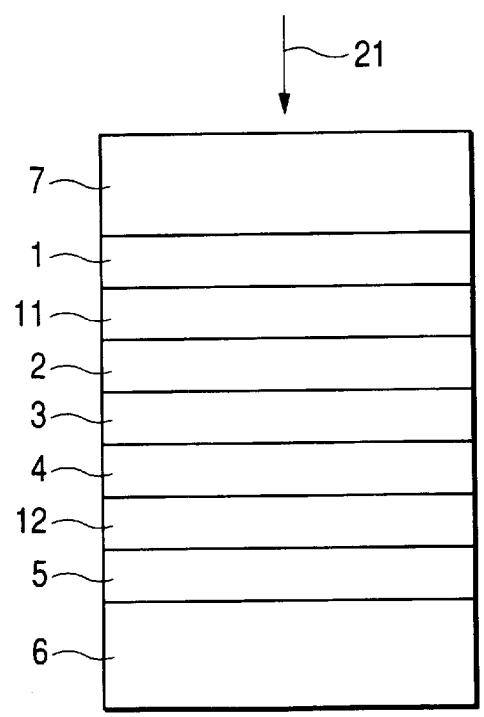
FIG. 4 is yet another example of the layer structure of the optical recording medium according to the invention.

FIG. 4 presents a further modification of the layer structure shown in FIG. 1 for the case where the metallic reflective layer 5 mainly comprises Ag, and the first protective layer 2 and the second protective layer 4 both comprise a sulfur-containing dielectric, in which an interdiffusion-protection layer 11 is provided between the semi-transparent layer 1 and the first protective layer 2, and an interdiffusion-protection layer 12 is provided between the second protective layer 4 and the metallic reflective layer 5.

The basic layer structure of low-to-high media has a semi-transparent layer mainly comprising a metal, a first protective layer comprising a dielectric, a recording layer, a second protective layer 2 comprising a dielectric, and a metallic reflective layer.

On the other hand, the medium of the present invention is characterized in that the recording layer is made of an alloy mainly comprising $Sb_xTe_{1-x}$ (0.7<x≦0.9) and that the semi-transparent layer mainly comprises Ag. It is also characterized by having an interdiffusion-protection layer between the semi-transparent layer and the first protective layer in case where the first protective layer comprises a sulfur-containing dielectric.

The alloy mainly comprising $Sb_xTe_{1-x}$ (0.7<x≦0.9) is an alloy system having, as a main component, an SbTe eutectic composition containing Sb in excess over $Sb_{70}Te_{30}$, the eutectic point, in an Sb—Te binary alloy phase diagram. The language "mainly comprising" is used to specifically mean "containing $Sb_xTe_{1-x}$ (0.7<x≦0.9) in an amount of 80 atom % or greater". This alloy will hereinafter be referred to simply as "an eutectic alloy system".

The above constitution provides, for the first time, a low-to-high medium having an eutectic alloy system recording layer and yet exhibiting improvements in repeated overwrite characteristics, write power margin, archival stability and the like. The medium is an optical recording medium superior to conventional ones in jitter, write power margin, repeated overwrite characteristics, archival stability and the like.

As stated above, overwriting is a technique of writing while erasing the existing information so that it involves transition to a crystalline phase and transition to an amorphous phase simultaneously. Since crystallization is generally slower, acceleration of crystallization leads to speeding up of overwriting.

According to the inventors' study, erasing of amorphous marks, namely, crystallization proceeds through two processes; (1) nucleation within amorphous areas and (2) crystalline growth starting from the boundaries between amorphous areas or molten areas (areas having been heated and melted by irradiation) and crystalline areas. Crystallization in a pseudo-binary alloy recording layer proceeds mainly through the process (1), whereas crystallization in an eutectic alloy system recording layer proceeds mainly through the process (2).

Accordingly, a pseudo-binary alloy recording layer could be made capable of high-speed overwriting by promoting nucleation. In an eutectic alloy system recording layer, to the contrary, the effect of nucleation is small, and an increase in crystalline growth rate is effective. However, an increased crystalline growth rate results in hindrance to transition to an amorphous phase. In order to enhance crystalline growth without impairing ability to form amorphous marks, it is therefore necessary to design the layer structure so that the recording layer may have an increased cooling rate, i.e., be made ready to be quenched.

In the medium of the present invention, in order to achieve erasing through high-speed crystallization and formation of satisfactory amorphous marks, it is particularly necessary to introduce a semi-transparent layer having a high thermal conductivity to promote heat dissipation thereby to secure a cooling rate.

Hence the medium of the present invention uses a semi-transparent layer mainly comprising Ag to produce a high heat dissipation effect. As a result, the medium can get rid of the disadvantage that satisfactory amorphous marks are not formed and thus achieves both erasing by high-speed crystallization and formation of satisfactory amorphous marks.

Besides, a semi-transparent layer mainly comprising Ag possesses high optical characteristics to produce a large reflectance difference between a crystalline state and an amorphous state so as to obtain a high contrast and a large signal amplitude.

While Au, Al, Cu, and the like are also generally known as a high reflectance metal, Ag is especially superior in heat dissipation and optical characteristics. The superiority is particularly conspicuous in short wavelengths of 650 nm or shorter. This seems attributable to the Ag's small absorption of short wavelengths and high thermal conductivity.

The language "mainly comprising Ag" means that the layer has an Ag content of 80 atom % or higher.

It is preferred that the metallic reflective layer also mainly comprises Ag, which provides high heat-dissipation capability and a high reflectance.

Where the first protective layer comprises a sulfur-containing dielectric (such a layer will hereinafter be referred to simply as "a sulfur-containing protective layer"), it is required to provide an interdiffusion-protection layer between the semi-transparent layer and the first protective layer.

If the sulfur-containing protective layer directly adjoins the semi-transparent layer mainly comprising Ag, the sulfur present in the protective layer diffuses into the semi-transparent layer to react with Ag, resulting in impairment of the semi-transparent layer's function. To avoid this, it is necessary to provide an interdiffusion-protection layer between these two layers. The material making up the interdiffusion-protection layer is required to have little diffusibility toward the Ag constituting the semi-transparent layer, i.e., not to form a compound or a solid solution with Ag. The material is also required to have low reactivity with the sulfur present in the protective layer or, if reactive, to produce a chemically stable sulfide.

Where the first protective layer contains no sulfur, the interdiffusion-protection layer is unnecessary, and the semi-transparent layer and the first protective layer can adjoin directly.

Where the metallic reflective layer mainly comprises Ag, and the second protective layer is a sulfur-containing protective layer, an interdiffusion-protection layer should be provided between the metallic reflection layer and the second protective layer for the same reason.

It is the above-described layer structure that made it feasible, for the first time, for a low-to-high medium having an eutectic alloy system recording layer to exhibit excellent performance in repeated overwrite characteristics, write power margin, archival stability and so forth. In addition, the medium exhibits markedly improved durability against overwriting as compared with conventional high-to-low media.

In other words, the fact that an eutectic alloy system recording layer is a recording layer of the type in which crystallization from an amorphous state proceeds chiefly through crystalline growth from the boundaries between amorphous or molten areas and crystalline areas necessitates the above-mentioned layer structure. Accordingly, the same layer structure can bring about improvements on the above-described characteristics when applied to recording layers other than the eutectic alloy system as long as the same crystallization process is followed.

The above layer structure makes it feasible to provide a low-to-high medium which has a recording layer of the type wherein crystallization from an amorphous state proceeds mainly through crystalline growth from the boundaries between amorphous or molten areas and crystalline areas and is yet excellent in repeated overwrite characteristics, write power margin, archival stability, and the like.

While the medium of the present invention is excellent when applied to a general two-level recording method, it displays pronounced improvement in durability against overwriting when applied to a multi-level recording method which makes use of multistage changes of reflectance as proposed by the inventors in Japanese Patent Laid-Open No. 84591/2001. Deterioration by repeated overwriting is manifested as changes in reflectance, and changes in reflectance directly cause detection errors for each level of reflectance in the multi-level recording system. Therefore, the multi-level recording system demands more stable overwrite characteristics. The demand can be met by the recording medium of the present invention.

The present invention will further be illustrated in more detail.

[1] Recording Layer

The phase-change recording layer used in the present invention is made of an alloy mainly comprising $Sb_xTe_{1-x}$ ($0.7<x\leq0.9$), i.e., an eutectic alloy system recording layer. If x is 0.7 or smaller, the recording layer, having no excess of Sb over the eutectic point $Sb_{70}Te_{30}$, is too slow in crystallization rate. If x is greater than 0.9, crystallization rate is too fast around room temperature, and amorphous marks become instable leading to poor archival stability of the medium.

The recording layer is preferably made of an alloy mainly comprising $(Sb_xTe_{1-x})_{1-y}Ge_y$ ($0.7<x\leq0.9$, $0<y\leq0.1$). Doping with Ge suppresses nucleation to improve the archival stability of the amorphous marks. It is said that the crystallization progress in an SbTe eutectic recording layer is essentially governed by crystalline growth more than by nucleation (see G. F. Zhou, H. J. Borg, J. C. N. Rijpers, M. H. R. Lankhorst, and J. J. L. Horikx, Proceedings of SPIE, 4090, 108 (2000)). Addition of Ge to such a material is assumed to further suppress nucleation. Since crystal nuclei are prone to be formed in relatively low temperature in a crystallization process to impair archival stability of amorphous marks, suppression of nucleation is believed to improve archival stability.

Further, Ge doping also produces the advantage that repeated overwriting hardly results in segregation, the recording layer is of eutectic alloy system, though.

One or more other elements may further be added to the above-described composition, provided that the amount of these elements added is not more than 10 atom %, preferably 1 to 5%, so as not to impair other characteristics.

Particularly preferred dopant elements are In and Ga, with which the boundaries of amorphous marks adjoining crystals become very smooth to reduce the jitter of mark edges and also to reduce noise.

At least one element selected from Si, Sn, Pb, Au, Pd, Pt, Zn, Zr, Hf, V, Nb, Ta, Cr, Co, Mo, Mn, Bi, O, N, S, Se, and rare earth elements may be added for, for example, finely adjusting optical characteristics or somewhat improving stability with time.

The recording layer preferably has a thickness of 5 nm or greater to secure sufficient optical contrast and to increase the crystallization rate thereby to complete writing and erasing in a short time.

To prevent cracking while securing sufficient optical contrast, the thickness of the recording layer is preferably not greater than 100 nm, still preferably 30 nm or smaller. With this range of thickness, the heat capacity is decreased, and the recording sensitivity can be increased. The above range of thickness is also effective to minimize volume change with phase transition thereby lessening the influences of repeated volume change with repeated overwriting upon the recording layer itself and the upper and the lower protective layers. These effects lead to suppression of irreversible microscopic deformation from being accumulated, reduction of noise, and improvement in durability against repeated overwriting.

In using a bluish purple laser beam having a wavelength, e.g., of 350 to 450 nm for writing and retrieving, the recording layer preferably has a thickness of 5 nm to 20 nm.

[2] Crystallization Process of Recording Layer

Crystallization in an eutectic system recording layer proceeds mainly through crystalline growth starting from the boundaries between amorphous areas or molten areas (molten areas resulting from temperature elevation due to irradiation) and crystalline areas.

Therefore, an eutectic system recording layer is advantageous in that generation of coarse grains due to nucleation is suppressed to reduce jitter as compared with pseudo-binary alloy recording layers (e.g., $GeSb_2Te_4$ and $Ge_2Sb_2Te_5$) that have been used widely.

Additionally, since crystallization proceeds mainly based on crystalline growth from the periphery of amorphous marks, marks having a larger size (area) take a longer time for crystallization (erasing). This means an advantage that the time required for crystallization (erasing) becomes shorter as the mark size gets smaller.

According as the mark size becomes smaller for achieving high-density recording, the utility of the eutectic system recording layer tends to increase. For example, the mark size (mark width) is about 0.4 μm or smaller, which corresponds to the case in which the wavelength of writing/retrieving light is shorter than about 650 nm, and the numerical aperture NA of the objective lens for condensing is greater than about 0.6.

The crystallization process of the recording layer will be described in more detail.

Crystallization of amorphous marks (recrystallization) in an eutectic alloy system recording layer proceeds mainly through crystalline growth from the crystal parts surrounding the amorphous marks. That is, it is considered that recrystallization is hardly accompanied by nucleation inside the amorphous marks and that the boundary points of the surrounding crystalline areas serve as nuclei from which crystalline growth proceeds. This is a great difference from the recrystallization process of a pseudo-binary alloy recording layer which involves two stages; nucleation randomly occurring within amorphous marks and growth of these crystal nuclei.

The recrystallization process can be confirmed by, for example, observing under a transmission electron microscope a recording layer having had an amorphous mark irradiated with a laser beam of relatively low erase power Pe evenly (in a direct current) to cause incomplete crystallization. A pseudo-binary alloy recording layer is found to have started to crystallize from the central portion of the amorphous mark where the temperature has risen, whereas an eutectic alloy system recording layer is found to have started crystalline growth from the peripheral portion of the amorphous mark.

The eutectic alloy system recording layer starts crystalline growth from not only the boundaries between amorphous areas and crystalline areas but the boundaries between molten areas and crystalline areas. Cases are sometimes observed in which molten areas once form amorphous areas and then begin crystallization. Otherwise, where the cooling rate in re-solidification following melting is too low to reach a critical cooling rate necessary for solidifying into an amorphous state, the molten area crystallizes as a whole almost instantaneously without being converted to an amorphous state.

If a medium is such that the reflectance becomes substantially even with that of a non-recorded or erased state (i.e., the reflectance of the crystalline phase) when the recording layer is irradiated with a laser beam having a write power Pw in a direct current mode, the medium can be judged as having such a recording layer as follows the above-mentioned crystallization process. Specifically, the non-recorded or erased state reflectance of a medium being taken as 100%, the medium of which the reflectance after write power irradiation falls within ±30% (i.e., 70 to 130%) of the former reflectance meets the needs. Seeing that cases are sometimes met with wherein the crystalline state varies depending on initialization conditions, it is advisable that the crystalline area of a medium having been initialized for crystallization followed by overwriting about 10 times be regarded as the "non-recorded or erased state" of the medium and that the reflectance of this state be taken as 100%. The term "reflectance" as referred to herein denote the reflectance of the medium.

In another way of describing, a recording layer that does not follow such a crystallization process never involves recrystallization of an entire molten region so that the reflectance after write power irradiation differs from that in an erased state.

A phase-change recording layer is generally amorphous immediately after film formation so that the entire area should be initialized into a non-recorded state by crystallization. It is desirable to conduct initialization by the melt-recrystallization process of the medium of the invention because noise can be reduced for the following reason. The crystalline state of an erased region resulting from overwriting (erased state) and the crystalline state resulting from melt-recrystallization are substantially equal, but a crystalline state resulting from initialization involving no melting differs from that resulting from melt-recrystallization, and so does the reflectance. Melt-recrystallization is carried out by irradiating the recording layer with a focused light beam in a direct current mode.

The mechanism of recrystallization from a molten state will further be described by way of experimentation.

Figure 5:
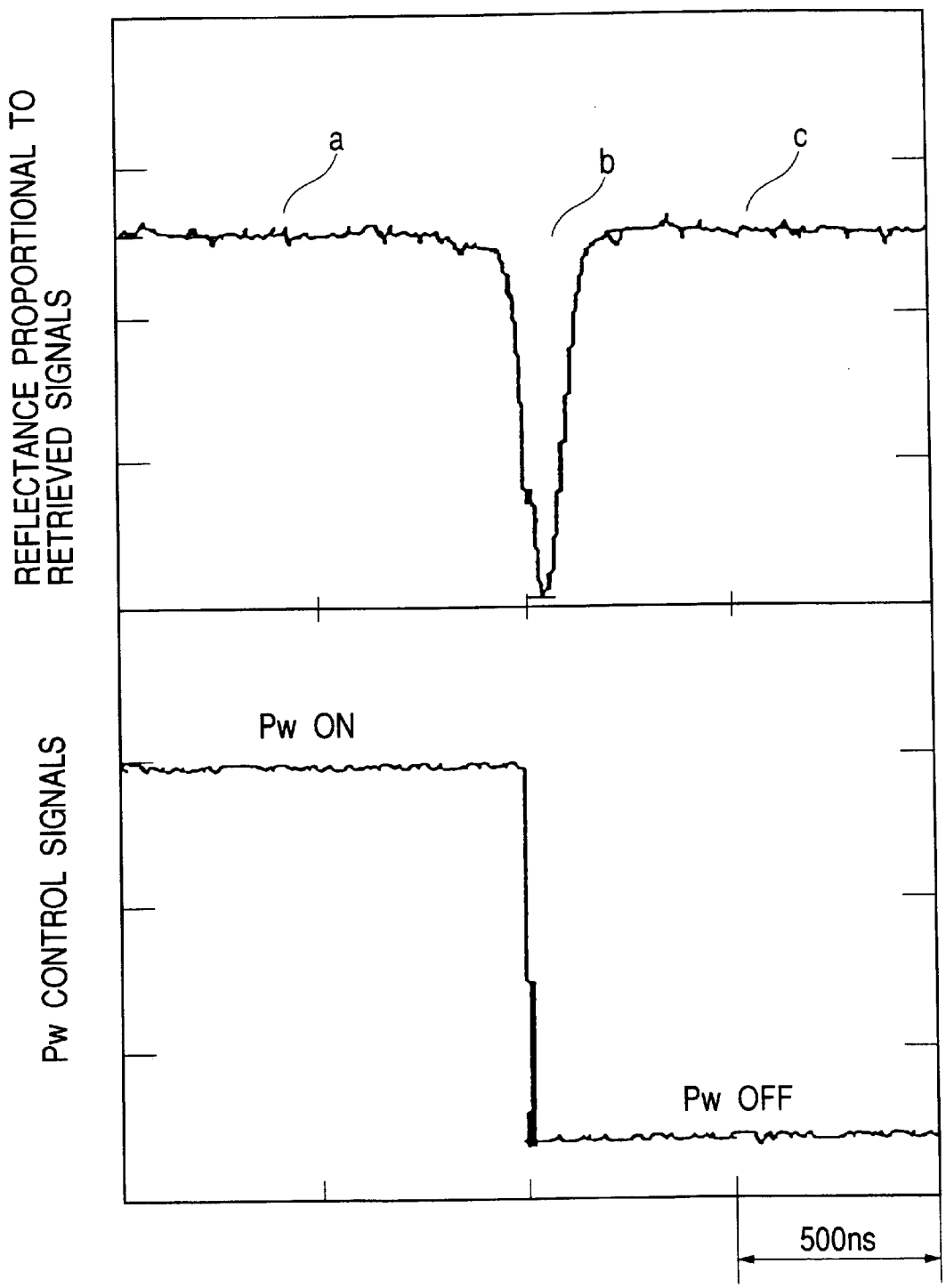
FIG. 5 is a diagram showing a write power applied and resultant changes of retrieved signals.

A recording track in its non-recorded state was scanned with a laser beam for writing and retrieving while tracking to apply write power Pw enough to melt the recording layer in a direct current mode. At a certain point, the laser beam was cut off. The lower half of FIG. 5 shows the Pw control signals in this situation. The cut-off of Pw was followed by application of read power Pr in a direct current mode.

The track was read by a laser beam having read power Pr to obtain retrieved signals shown in the upper half of FIG. 5. The retrieved signals are proportional to reflectance. The retrieved signal intensity (reflectance) temporarily fell at the Pw cut-off position (b) and kept constant elsewhere (a and c).

TEM observation of the medium revealed that an amorphous mark had been formed in the part (b) having a reduced reflectance, with the front and the rear portions (a) and (c) found to be in a crystallized state. The crystallized states of (a) and (c) were substantially equal and indistinguishable. This indicates that molten areas recrystallize into the same crystals as in non-recorded parts as far as Pw is applied in a direct current mode, and only the molten area close to the Pw cut-off point is rendered amorphous.

This is because when Pw is applied in a direct current mode, cooling of the recording layer is suppressed by the thermal diffusion of the following part so that a critical cooling rate necessary for amorphous mark formation is not reached. By turning off Pw to an almost zero level, the thermal diffusion of the following part is shut to allow a cooling rate sufficient for amorphous mark formation.

Where the same experimentation was carried out but with varying write power Pw, cutting Pw resulted in localized reduction of reflectance as in (b) in FIG. 5 as long as the Pw is sufficient for melting the recording layer. The part having the reduced reflectance was found to have formed an amorphous mark. Conversely, a reduction in reflectance if observed in the vicinity of Pw cut-off point indicates that this point of the recording layer has been melted by write power Pw application to form an amorphous mark.

Crystallization (recrystallization) in an eutectic system recording layer proceeds chiefly through crystalline growth from the crystalline areas surrounding amorphous areas and molten areas. Such a recording layer shows a high crystallization rate and is liable to recrystallize. It follows that the reflectance after melt-recrystallization is approximately the same as the reflectance in a non-recorded state. As a matter of course, these reflectance are not always quite the same, and it depends on the beam shape or the scanning speed of the beam. Specifically, the reflectance in (a) of FIG. 5 being taken as 100%, it is advisable that the reflectance in (c) falls within ±30% of the former.

It has hitherto been believed that materials showing remarkable recrystallization are unfit for recording. This is because Pw application for a certain time or longer for forming a long mark causes most of a molten region to recrystallize, leaving only the part right after the Pw cut-off point amorphous.

To the contrary, the inventors have found that a recording layer which follows the above-described crystallization process rather produces better results in jitter in high-density mark-length modulation recording. In particular, a combined use of a divided pulse recording method is effective.

[3] Divided Pulse Recording Method

A divided pulse recording method is a technique for forming a long amorphous mark in which laser pulses of high power and those of low power alternate in irradiation.

Laser pulses of high power will be referred to as "writing pulses", and the power applied by the writing pulses will be referred to as "write power Pw". Laser pulses of low power will be referred to as "off-pulses", and the power applied by off-pulses will be called "bias power Pb". Bias power Pb is so low as not to cause recrystallization in a solid phase.

By this strategy, the regions heated by writing pulses are relatively quenched while off-pulses are being applied and therefore easily form an amorphous state. Being capable of recording with small write power Pw is favorable for shortening the rise time and fall time of pulses or for cutting the cost of a laser to be used. However, being capable of recording with small power means being liable to deterioration by retrieving light. Therefore, the medium is preferably designed to fit for a write power Pw ranging 8 to 25 mW, particularly 8 to 20 mW, especially 8 to 17 mW.

The bias power Pb is preferably not more than 0.5 times the write power Pw (Pb/Pw≦0.5), still preferably not more than 0.3 times the write power Pw (Pb/Pw≦0.3). Taking tracking performance, etc. into account, the bias power Pb is preferably close to the power Pr of retrieving light irradiated on retrieving. The read power Pr usually ranges from 0.5 to 1.0 mW.

Where acceleration of cooling rate is desired, it is advisable to reduce the bias power Pb. The bias power Pb could be reduced to zero, meaning no irradiation.

For crystal formation, it is preferable to irradiate the recording layer with a laser beam of erase power Pe. The erase power Pe is not particularly limited in intensity insofar as the recording layer can be heated so that the crystals may be deleted on overwriting. It is usually greater than the bias power Pb and smaller than the write power Pw. For example, 0.2≦Pe/Pw<1.0. The intensity of the erase power Pe is also related to the recrystallizing areas of the parts having been melted by irradiation with write power Pw.

On continuous exposure to erase power Pe, the recording layer is heated up to around the crystallizing temperature, and, at the same time, the heated areas are relatively and slowly cooled to form crystals.

Amorphous state and crystalline state can thus be formed selectively by combining the above-mentioned operations to accomplish recording in an overwrite mode.

A specific example of amorphous state formation by alternately applying writing pulses and off-pulses is shown below. For forming (amorphous) marks having a length nT (T: reference clock period; n: natural number) a time nT is divided as represented by formula (1):

$$\alpha_1 T, \beta_1 T, \alpha_2 T, \beta_2 T, \ldots, \alpha_{m-1} T, \beta_{m-1} T, \alpha_m T, \beta_m T \quad (1)$$

(wherein $\alpha_1 + \beta_1 + \alpha_2 + \beta_2 + \ldots \alpha_{m-1} + \beta_{m-1} + \alpha_m + \beta_m = n-j$; j is a real number of 0 or greater; m is an integer of 1 or greater; and j and m are values decided by the combination of a medium and recording conditions).

According to the above formula, recording is carried out by applying writing pulses each for a time $\alpha_i T$ (1≦i≦m) and off-pulses each for a time $\beta_i T$ (1≦i≦m). Areas between marks (crystalline phases) are irradiated with light having erase power Pe. Overwriting is thus accomplished.

Figures 6A, 6B:
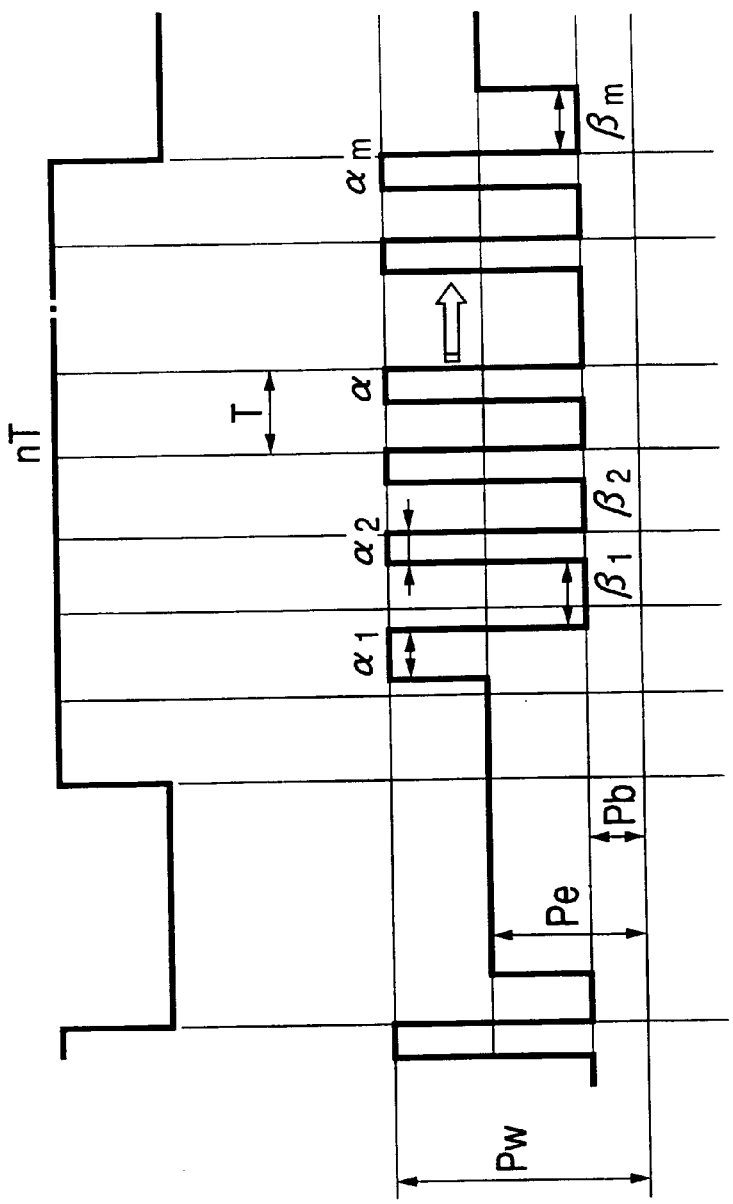
FIG. 6 is a diagram illustrating an example of a divided pulse recording method.

In FIG. 6 is shown an embodiment of the divided pulse recording method, in which (a) is recording signals, and (b) illustrates the laser wave form for forming amorphous state and crystalline state in agreement with the recording signals.

In FIG. 6, the rise of the leading pulse, the rise of the final off-pulse, etc. do not necessarily need to agree with the starting point and the ending point of the original recording signals. The total width of pulses (n–j) can be finely adjusted according to the lengths of front and rear marks or the lengths between marks.

In order to obtain characteristic balance between long marks and short marks, it is the most effective manipulation that only the leading writing pulse $\alpha_1$ is made longer than the following pulses and only the leading and the tail off-pulse widths $\beta_1$ and $\beta_m$ are set different from other off-pulses. This is because the leading writing pulse $\alpha_1$, receives no thermal diffusion so that it needs a somewhat longer time for temperature elevation. It is also effective otherwise that the power of only the leading writing pulse $\alpha_1$, is set higher.

In some cases, satisfactory marks can be formed by varying only $\beta_m$ in accordance with the mark length nT. In EFM modulation or EFM+modulation, for example, because longer marks, such as 11T mark, 14T mark, etc., are more liable to accumulate heat, it is recommended to make $\beta_m$ longer thereby to lengthen the cooling time. Conversely, it is advisable to make $\beta_m$ shorter for short marks, e.g., 3T. $\beta_m$ could be set at zero. The adjustment width of $\beta_m$ is preferably about 0.5T.

In addition, switching of pulses can be synchronized with the clock period to make pulse control easier.

[4] Highly Heat-dissipating Layer Constitution

It is indispensable for the medium of the invention having an eutectic alloy system recording layer that the cooling efficiency be increased over the level required for pseudo-binary alloy recording layers. The necessity of providing the eutectic alloy system recording layer with a highly heat-dissipating layer structure is explained below.

The recording layer used in the invention is made of an eutectic alloy system having a higher Sb/Te ratio than 70/30. It is excellent in capability of high-speed erasing at a linear velocity of 10 m/s or higher but is so liable to recrystallize that it tends to have difficulty in forming satisfactory amorphous marks.

As a linear velocity increases, the time of irradiating an area with erase power Pe becomes shorter. That is, the time of maintaining the recording layer at an elevated temperature around the melting point becomes extremely short, which can result in insufficient crystalline growth. In order to ensure such short-time erasing, the crystalline growth rate of the recording layer around the melting point should be increased appreciably.

It is an effective means for this purpose to increase the Sb content of the matrix SbTe alloy to increase the excess Sb over $Sb_{70}Te_{30}$ (see M. Horie, N. Nobukuni, K. Kiyono, and T. Ohno, Proceedings of SPIE, 4090, 135 (2000)). However, an increased Sb content accelerates not only recrystallization from the crystalline areas surrounding amorphous marks but also crystalline growth rate at the time of melt-resolidification.

If the rate of recrystallization from the periphery of amorphous marks increases over a certain level, when molten areas which are to form amorphous marks are resolidified, recrystallization proceeds from the periphery of the molten areas, and as a result the molten areas tend to recrystallize, failing to get amorphous. This tendency is particularly conspicuous in overwriting at a linear velocity of 5 to 6 m/s or higher. To avoid this, the cooling rate of the recording layer must be increased extremely.

In a pseudo-binary alloy recording layer, on the other hand, nucleation is of importance, and the crystalline growth rate is rather slow. Even with crystalline growth proceeding relatively slowly, crystallization can be accomplished by producing a large number of crystal nuclei and filling the whole amorphous areas with crystal grains. Thus, high-speed erasing is achieved by promoting nucleation.

Nucleation generally reaches the maximum at a fairly lower temperature than the melting point compared with crystalline growth. Therefore, in the stage of temperature rise near to the melting point, crystal nuclei are formed in relatively low temperature, which then grow at temperatures near the melting point. Recrystallization efficiently proceeds in this order. On the other hand, in the stage of temperature fall from the molten state below the melting point, crystal nuclei, if formed in relatively low temperature, are hardly created. Satisfactory amorphous marks are thus formed even though the cooling rate of the recording layer is relatively low.

[5] Metallic Reflective Layer

In order to achieve erasing through high-speed crystallization and formation of satisfactory amorphous marks, it is necessary in the present invention to combine the recording layer with a reflective layer having a high thermal conductivity, whereby heat dissipation is accelerated to assure a cooling rate for the recording layer.

The metallic reflective layer preferably has a thickness of 40 nm or greater to provide a sufficient reflectance. The thickness is preferably 400 nm or smaller so as to reduce the film stress and to shorten the film forming time and the production time thereby to reduce the cost. The thickness is still preferably 200 nm or smaller. Generally speaking, a greater film thickness results in accelerated heat dissipation but incurs a higher film stress which can result in cracks.

For those media of film-side-incidence type (e.g., FIG. 1) it is preferred to further reduce the film thickness. In this type of media, the flatness of the reflective layer, which is the first layer to be formed, governs the flatness of all the other layers formed thereon. Poor flatness of the reflective layer will cause writing/retrieving light to scatter, which can cause noise. The thicker the reflective layer, the poorer the flatness. From this viewpoint, it is usually preferred for the reflective layer to have a thickness of 100 nm or smaller.

The flatness of the reflective layer is preferably such that the roughness of the surface profile is less than 1 nm as measured under an atomic force microscope (AFM). The "roughness" is used to mean the standard deviation of vertical differences from a base plane, the base plane having the mean height of peaks calculated from the surface profile.

Materials used to form the metallic reflective layer preferably have a small absorption for writing/retrieving light. Considering the importance of the role as a heat-dissipating layer, the materials preferably have a high thermal conductivity. Accordingly, metals of high reflectance, such as Ag, Al, Au and Cu, or alloys mainly comprising these metals are preferably used to make the reflective layer.

With impurities incorporated, these metals reduce their thermal conductivity and increase light absorption. On the other hand, addition of some dopant elements may bring improvement on stability or film flatness. The reflective layer may be made of alloys comprising Ag, Al, Au or Cu and up to 10 atom % of impurity elements. The impurity elements include Cr, Mo, Mg, Zr, V, Nb, Hf, Ag, In, Ga, Zn, Sn, Si, Cu, Au, Al, Pd, Pt, Pb, Cr, Co, Ti, rare earth elements, O, and N. A still preferred concentration of these elements is 5 atom % or lower.

Ag is less absorptive for light of short wavelengths than Au, Cu and Al. Therefore it is particularly preferred in using a short wavelength laser having a wavelength of 650 nm or shorter.

Ag has a high thermal conductivity. It also has a high reflectance with a certain film thickness. It is therefore expected to produce an optical interference effectively, which can be taken advantage of to increase a signal amplitude, and a sufficient heat dissipation effect. Ag is also preferred from the aspect of productivity and economy because of its relative competitiveness in price as a sputtering target, capability of producing a stable discharge and achieving a high deposition rate, and stability in air. Ag is superior to Al, Au, Cu, etc. in these respects. Accordingly, it is advantageous to make the reflective layer of metals or alloys mainly comprising Ag.

The thermal conductivity of the reflective layer is considered to be generally in inverse proportion to its volume resistivity according to Wiedemann-Franz law. Also, the heat dissipation effect by the reflective layer is proportional to the film thickness and therefore inversely proportional to area resistivity. Accordingly, the thermal conductivity and the heat dissipation effect can be evaluated by measuring the resistivities. In the case of a thin film in general, a thermal conductivity is difficult to measure, but a resistivity is relatively easy to measure.

In order to obtain a sufficient heat dissipation effect, it is preferred for the reflective layer to have an area resistivity of 0.5 Ω/□ or lower, more preferably 0.4 Ω/□ or lower. Considering that too high a heat dissipation effect of the reflective layer can result in deterioration of the recording sensitivity, the area resistivity is preferably 0.2 Ω/□ or higher.

To attain the above-specified area resistivity with a small film thickness, it is preferred for the reflective layer to have a volume resistivity of 100 nΩ·m or lower. A smaller volume resistivity of the reflective layer produces better results, but the practically attainable minimum is 20 nΩ·m because such a thin film as has a thickness of about 100 nm has about 10 times as much volume resistivity as that in a bulk state.

[6] Semi-transparent Layer

One of the features of the present invention resides in that the semi-transparent layer is made of Ag or an alloy mainly comprising Ag. By this structure, the heat of the recording layer is let to escape into both the reflective layer and the semi-transparent layer to further ensure heat dissipation. Further, the semi-transparent layer mainly comprising Ag has small absorption for short wavelength light and largely differs in refractive index from the protective layer (usually having a refractive index of 1.5 to 2.5) to produce a large difference in reflectance between a crystalline state and an amorphous state. As a result, a high contrast and a large signal amplitude are imparted to the low-to-high medium. The recording sensitivity is also improved.

The term "semi-transparent" as used herein for a film is usually used to describe a condition having a light transmission of 10% or more. The semi-transparent state as intended in the present invention preferably has a transmission of at least 20%, particularly 30% or more. The upper limit of the transmission is 100%. The transmission is obtainable through calculation from the complex refractive index for the light having the wavelength used and the film thickness.

Preferably, the reflectance Ra (%) of the medium with the recording layer being in an amorphous state and the reflectance Rc (%) of the medium with the recording layer being in a crystalline state satisfy the relationship: Ra−Rc≧15 (%). Satisfaction of this relationship means obtaining a high contrast and a large signal amplitude with a low-to-high medium.

Since an eutectic alloy system recording layer has a character that it is difficult to obtain a large Ra−Rc for short wavelength light, use of the semi-transparent layer is of high utility especially for wavelengths of 450 nm or shorter.

Rc and Ra can roughly be obtained through optical calculation. It should be noted, however, that found values of Ra tend to be lower than calculated values of Ra by about 5 points because amorphous marks are formed on the crystalline background so that the influences of the reflection from the crystalline area cannot be excluded. Found values of Rc and calculated ones are in substantial agreement.

The relationship: Ra−Rc≧15%, which is preferred in the present invention, is based on the found values. Accordingly, the relationship corresponds to Ra−Rc≧20% in terms of calculated values.

To accomplish high recording sensitivity without adversely affecting the focus servo system or the tracking servo system, 0%<Rc≦15% is preferred. To stably maintain these servo systems, 5%≦Rc is still preferred.

The thickness of the semi-transparent layer is decided by optical conditions and thermal conditions. For the semi-transparent layer which mainly comprises Ag to be semi-transparent, a film thickness of 50 nm or smaller is preferred. A thickness of 40 nm or smaller is preferred to provide a low-to-high medium having a high contrast and a large signal amplitude. The thickness is preferably not smaller than 1 nm for performing the functions as a semi-transparent layer.

The optimum film thickness is also subject to variation depending on the wavelength of laser light used. For example, a thickness of 5 to 30 nm is preferred for laser light wavelengths of 350 to 450 nm. With a thickness exceeding 30 nm, the Rc's dependency on the first protective layer thickness is so steep that control of Rc by film thickness is difficult. The thickness of 30 nm or smaller is also favorable for Rc control within the range 5 to 15%. A thickness smaller than 5 nm tends to result in a reduced contrast of Ra−Rc. A thickness of 10 nm or greater is still preferred for obtaining a high heat dissipation effect.

The semi-transparent layer used in the invention comprises Ag or an alloy mainly comprising Ag. With impurities incorporated, Ag reduces its thermal conductivity and increases light absorption. On the other hand, addition of some dopant elements may bring improvement on stability and/or film flatness so that an Ag alloy containing not more than 10 atom % of impurity elements can be used as well. The impurity elements include Cr. Mo, Mg, Zr, V, Nb, Hf, Ag, In, Ga, Zn, Sn, Si, Cu, Au, Al, Pd, Pt, Pb, Cr, Co, Ti, rare earth elements, O, and N. A still preferred concentration of these elements is 5 atom % or lower.

A dielectric multilayer film which is a stack of dielectric layers of different refractive indices (dielectric mirror) is known as a semi-transparent layer. However, the dielectric multilayer film is apt to delamination under some environmental conditions and incapable of producing a heat dissipation improving effect as obtained with metals.

The semi-transparent layer preferably has an area resistivity of 0.5 Ω/□ or lower, more preferably 0.4 Ω/□ or lower, to produce a sufficient heat dissipation effect. Considering that too high a heat dissipation effect of the semi-transparent layer can result in deterioration of the recording sensitivity, the area resistivity is preferably 0.2 Ω/□ or higher.

To attain the above-specified area resistivity with a small film thickness, it is preferred for the semi-transparent layer to have a volume resistivity of 100 nΩ·m or lower. A smaller volume resistivity of the semi-transparent layer produces better results, but the practically attainable minimum is 20 nΩ·m because such a thin film as has a thickness of about 100 nm has about 10 times as high volume resistivity as that in a bulk state.

As described hereinabove, the eutectic system recording layer according to the present invention and the semi-transparent layer mainly comprising Ag are combined to constitute a low-to-high medium, which achieves enhanced heat dissipation properties and increased light energy absorption of the crystalline state. As a result, a high recording sensitivity, a high contrast and a large signal amplitude are attained.

[7] Protective Layers

In the present invention the recording layer is protected by protective layers from its both sides. The protective layer facing the semi-transparent layer is designated a first protective layer, and the one facing the reflective layer is called a second protective layer. The medium of the invention which receives a writing/retrieving laser beam from its substrate side is basically composed of a substrate, a semi-transparent layer, a first protective layer, a recording layer, a second protective layer, and a reflective layer, and a protective coating layer is provided thereon if desired (see FIG. 2). Where writing/retrieving laser beam is incident on the film side, the medium has a reverse layer order, i.e., a substrate, a reflective layer, a second protective layer, a recording layer, a first protective layer, and a semi-transparent layer, and a transparent coating layer (cover layer) is provided if desired (see FIG. 1). In some applications, a stack of these layers may be provided on each side of a substrate, or a pair of the layer structures may be joined with the film sides (protective coating layers) inside to provide the medium.

The material to be used to make the protective layers is chosen paying attention to refractive index, thermal conductivity, chemical stability, mechanical strength, adhesion, and the like. The protective layers generally comprise dielectrics having high transparency and high melting points. Specifically, oxides, sulfides or nitrides of metals or semiconductors and fluorides of Ca, Mg, Li, etc. are useful. The oxides, sulfides, nitrides and fluorides do not necessarily have to have a stoichiometric composition. It is effective for obtaining a controlled refractive index, etc. to control the composition or to mix compositions. More specifically, mixtures of ZnS or a rare earth element sulfide and heat-resistant compounds such as oxides, nitrides and carbides are useful. From the standpoint of mechanical strength, the protective layers preferably have a film density of 80% or more of the density in a bulk state.

The protective layers are often made of sulfur-containing dielectric materials. For example, protective layers made of a mixture comprising about 80 mol % of ZnS and about 20 mol % of $SiO_2$ are widely used. Such a mixture is excellent in adhesion to Sb or Te, the main component of the recording layer, and capable of suppressing defect growth due to delamination which may occur in repeated overwriting or during long-term storage.

Specifically, the mixture preferably comprises 20 mol % to 90 mol % of a sulfide, such as zinc sulfide, tantalum sulfide or a rare earth element (e.g., Y, La, Ce or Nd) sulfide or an oxysulfide such as $Y_2O_2S$, either individually or as a mixture thereof. The balance of the mixture preferably comprises heat-resistant compounds whose melting point or decomposition point is 1000° C. or higher. The heat-resistant compounds having a melting or decomposition point of 1000° C. or higher include oxides, nitrides or carbides of Mg, Ca, Sr, Y, La, Ce, Ho, Er, Yb, Ti, Zr, Hf, V, Nb, Ta, Zn, Al, Si, Ge, Pb, etc. and fluorides of Ca, Mg, Li, etc.

The most preferred material includes a mixture of the heat-resistant dielectric and ZnS and a mixture of the heat-resistant dielectric, $Y_2O_2S$, and ZnO.

Protective layers comprising solely of dielectrics with no sulfur are also useful as a matter course.

It is particularly desirable that the thermal conductivity of the first protective layer be higher than that of the second protective layer. Although there is the Ag-containing semi-transparent layer near the first protective layer, the semi-transparent layer cannot be made so thick as the reflective layer. Therefore, it is preferable to increase the thermal conductivity of the first protective layer to make up for the heat dissipation properties. For this purpose, it is preferred to make the first protective layer of a material having a high thermal conductivity, such as sulfur-free oxides or nitrides.

It is preferred that the protective layers be substantially transparent to writing/retrieving light, having a high refractive index ranging from 2.0 to 2.4 so as to draw the maximum optical interference effect. The language "substantially transparent" as used here means that the imaginary part of the complex refractive index has an absolute value of 0.1 or smaller, preferably 0.05 or smaller.

The thicknesses of the recording layer and the protective layer are not only restricted from the above-described aspects of mechanical strength and reliability but should be decided taking into account the interference effect accompanying the multilayer structure so that a laser beam may be absorbed efficiently and that the amplitude of recording signals, i.e., the contrast between the recorded state and the non-recorded state may be increased.

The protective layers preferably have a thickness of 1 nm or greater to prevent deformation of the recording layer. The thickness is preferably not greater than 500 nm so as to minimize the internal stress of the dielectric constituting the protective layers and the difference in elastic characteristics from the adjacent films thereby inhibiting crack development.

Materials constituting the protective layers generally have a deposition rate and require a long film forming time. In order to shorten the film forming time and the production time thereby to reduce the cost, the thickness of the protective layers is preferably not more than 200 nm. If the protective layers are too thick, the groove configuration on the recording layer surface will fairly deviated from that formed on the substrate. From this viewpoint, too, a thickness of 200 nm or smaller is preferred. A still preferred thickness is 150 nm or smaller.

The first protective layer (the one between the semi-transparent layer and the recording layer), in particular, should suppress deformation of the substrate or the transparent coating layer due to heat. Supposing no semi-transparent layer is provided, the first protective layer would usually have to have a thickness of 50 nm or greater. In the present invention, the existence of the semi-transparent layer serves to alleviate thermal damage that may be inflicted on the substrate or the cover layer adjoining the semi-transparent layer. Therefore, 1 nm or greater suffices as a thickness of the first protective layer.

The first protective layer is preferably as thin as 100 nm or smaller so that the heat dissipation effect of the semi-transparent layer may be manifested to the full. Further, a thickness of 40 nm or smaller is preferred for obtaining a high contrast with wavelengths of about 400 nm thereby preventing heat accumulation in the protective layer having a low thermal conductivity.

The second protective layer (the one between the metallic reflective layer and the recording layer) preferably has a thickness of 10 nm or greater to suppress deformation of the recording layer. In general, repeated overwriting results in accumulation of microscopic plastic deformation inside the second protective layer, which will lead to scattering of retrieving light to increase noise. To avoid this, the protective layer preferably has a thickness of 60 nm or smaller.

Further, in order to make a low-to-high medium by use of the interference effect, it is preferred for the second protective layer to have a relatively large thickness of about 30 to 50 nm for use with wavelengths of about 400 nm. Where the second protective layer has such a relatively large thickness, the metallic reflective layer is made of a material having a particularly high thermal conductivity.

In summary, the medium which is to be used with light having a wavelength of, e.g., from 350 nm to 450 nm preferably has a semi-transparent layer thickness of 5 nm to 30 nm, a first protective layer thickness of 1 nm to 40 nm, a recording layer thickness of 5 nm to 20 nm, a second protective layer thickness of 30 nm to 50 nm, and a metallic reflective layer thickness of 40 nm to 100 nm. Note that having substantial transparency for writing/retrieving light and a refractive index of 2.0 to 2.4 are prerequisites of the first and the second protective layers.

[8] Interdiffusion-protection Layer

The present invention is characterized by having an interdiffusion-protection layer between the semi-transparent layer and the first protective layer in case where the first protective layer contains a sulfur-containing dielectric. Where the metallic reflective layer mainly comprises Ag, and the second protective layer comprises a sulfur-containing dielectric, it is necessary to provide an interdiffusion-protection layer between the reflective layer and the second protective layer.

If the sulfur-containing protective layer and the semi-transparent layer mainly comprising Ag are in direct contact, sulfur in the protective layer diffuses into the semi-transparent layer to react with Ag, resulting in impairment of the functions of the semi-transparent layer. Therefore, an interdiffusion-protection layer should be disposed therebetween to avoid this.

As demonstrated in Examples hereinafter given, a layer structure having an Ag semi-transparent layer, a sulfur-containing first protective layer, a recording layer, a sulfur-containing second protective layer, and an Ag reflective layer in this order is unsatisfactory in, for example, characteristics after repeated overwriting.

Materials making an interdiffusion-protection layer are required to have little diffusibility toward Ag making the semi-transparent layer, namely, incapability of forming any compound or any solid solution with Ag. They are also required to have low reactivity with the sulfur present in the protective layer or, if reactive, to produce a chemically stable sulfide.

The interdiffusion-protection layer should be made of those materials which satisfy the following conditions: to be hardly diffusible into the semi-transparent layer or the reflective layer, to have good adhesion to the semi-transparent layer or the reflective layer, to have good adhesion to the sulfur-containing protective layer, to hardly allow sulfur atoms to diffuse, and the like. For example, materials which meet these conditions are selected appropriately from among metals or alloys, various compounds, and mixtures thereof.

Preferred metals or alloys include silicon, nickel, tantalum, cobalt, chromium, tungsten, and vanadium. Inter alia, tantalum and nickel are still preferred for their causing no problems, such as delamination due to internal stress of a thin film, and their satisfactory stability. Tantalum is particularly preferred.

The compound is selected from metal oxides, metal nitrides, metal carbides, semiconductor oxides, semiconductor nitrides, semiconductor carbides, amorphous carbon, and so forth. The compound is preferably stable and resistant to heat, having a melting point of 1000° C. or higher. Specific examples of such compounds are silicon oxide, silicon nitride, silicon carbide, tantalum oxide, cerium oxide, lanthanum oxide, yttrium oxide, aluminum oxide, and silver oxide. The amorphous carbon includes highly transparent amorphous hydrogenated carbon. Particularly preferred among them are silicon oxide and tantalum oxide; for they provide an interdiffusion-protection layer that also serves as a dielectric protective layer. Silicon oxide is the most preferred.

It is desirable for the interdiffusion-protection layer to have a small absorption against the wavelength of writing/retrieving light. In particular, it is desirable that the interdiffusion-protection layer provided between the semi-transparent layer and the first protective layer should have a high optical transmission and therefore be made of a transparent dielectric showing substantially no absorption. It is acceptable that the interdiffusion-protection layer provided between the reflective layer and the second protective layer shows light absorption to some extent, so that metals or alloys are suitably used therefor as well.

The interdiffusion-protection layer is desirably formed as thin as possible so that the optical and thermal properties of the semi-transparent layer or the reflective layer may be fully manifested. Specifically, a thickness of 10 nm or smaller is preferred, and a thickness of 5 nm or smaller is more preferred. Too thin an interdiffusion-protection layer tends to fail to exhibit a sufficient interdiffusion-protection effect. A preferred thickness for securing sufficient archival stability is at least 0.5 nm, more preferably 1 nm or larger.

Being amorphous, a transparent dielectric is capable of forming a thin and uniform film without being influenced by crystal grains, which occur with metals to impair the film flatness, etc. Therefore, an interdiffusion-protection layer made of a transparent dielectric is serviceable with even a relatively small thickness.

Incidentally, where the semi-transparent layer and the first protective layer, or the second protective layer and the reflective layer, are successively formed, cases are sometimes met with in which the semi-transparent layer reacts with oxygen, etc. in the film formation atmosphere, or the reflective layer reacts with oxygen, etc. adsorbed by the protective layer, to form a layer partially made of a passive metal oxide on the interface, which substantially acts like an interdiffusion-protection layer.

Nevertheless, the interdiffusion-protection effect of such a layer is not much. It is desirable to positively provide an interdiffusion-protection layer to secure sufficient archival stability.

The above-described recording layer, protective layers, reflective layer, semi-transparent layer, and interdiffusion-protection layer(s) can be formed by sputtering or a like technique. Film formation by sputtering is preferably carried out by means of an in-line system having the respective sputtering targets for these layers in the same vacuum chamber. This is advantageous for preventing oxidation or contamination from occurring between layers. It is also superior from the aspect of productivity.

The medium according to the present invention exhibits improvements in terms of minimum jitter with varied write power intensities and write power margin over known high-to-low media having a first protective layer, a recording layer, a second protective layer, an interdiffusion-protection layer, and a reflective layer. The reason of the improvements has not been necessarily made clear, the following possibilities are conceivable, which are assumed to influence each other to produce effects.

Deterioration of characteristics of phase-change optical recording media due to repeated-overwriting is considered ascribable chiefly to movement of the recording layer by repeated overwriting.

The medium of the invention which is of the substrate-incidence type has a first protective layer and a recording layer on a semi-transparent layer. Since the semi-transparent layer has a moderately rough surface, it is conceivable that the recording layer provided afterward is in a state restrained from moving with repetition of overwriting. Further, the heat distribution in the medium on writing is assumably such that the movement of the recording layer is reduced as compared with ordinary high-to-low media.

Furthermore, seeing that deterioration of characteristics of ordinary high-to-low media due to repeated overwriting is primarily caused by thermal deformation of the substrate and the like, it is predictable that the layer structure of the present invention which contains a semi-transparent layer mainly comprising Ag lessens the damage on the substrate.

[9] Other Layer Structure

Other layer structure which constitute the optical recording medium of the invention will be described.

The substrate of the optical recording medium of the invention is disposed near to either the semi-transparent layer or the reflective layer. Useful substrates include resins such as polycarbonate, polyacrylate and polyolefins and glass. Where writing/retrieving light is incident on the substrate side, the substrate must be transparent to the writing/retrieving light. Of the above materials, polycarbonate is preferred for their achievements over the past, inexpensiveness, and economy.

The substrate usually has a thickness of 0.05 to 5 mm, preferably 0.1 to 2 mm.

The medium of the substrate-incidence type additionally has a protective coating layer on the metallic reflective layer opposite to the second protective layer side. The protective coating layer is made of, for example, ultraviolet-curing resins, dielectrics or plastics. The protective coating layer usually has a thickness of 1 $\mu$m to 200 $\mu$m.

The medium of the film-side-incidence type additionally has a transparent coating layer (cover layer) on the semi-transparent layer opposite to the first protective layer side. The transparent coating layer is made of, for example, ultraviolet-curing resins, dielectrics or plastics. The transparent coating layer preferably has a thickness of 10 $\mu$m or greater for protecting the recording layer, etc. from an optical head. Too thick the transparent coating layer makes the recording layer far from the head to make high-density recording difficult. So, the thickness is preferably not greater than 200 $\mu$m.

In general, the medium of the film-side-incidence type brings the recording layer closer to an optical head than the medium of the substrate-incidence type and is therefore better suited to high-density recording.

The medium of the invention is not limited to the above-described layer structures. According to necessity, an additional layer may be provided in between layers, or each layer may be composed of a plurality of films.

In the present invention the above-described layer structure design has first brought about improvements on low-to-high medium using an eutectic alloy system recording layer in repeated overwrite characteristics, write power margin, archival stability, and the like.

The invention provide a low-to-high medium having a recording layer in which crystallization from an amorphous state proceeds chiefly through crystalline growth from the boundaries between amorphous areas or molten areas and crystalline areas and yet exhibiting superiority in repeated overwrite characteristics, write power margin, archival stability, and the like.

The optical recording medium of the invention is superior to conventionally known media in jitter, write power margin, repeated overwrite characteristics, archival stability and the like.

EXAMPLES

The present invention will now be illustrated in greater detail with reference to Examples, but the present invention is not construed as being limited thereto unless modifications depart from the spirit and scope of the present invention.

The terms "Ag semi-transparent layer" and "Ag reflective layer" as used hereunder indicate that the layers are made of substantially pure Ag, a thin film of which has a volume resistivity of about 30 Ω·nm. The terms "Ag alloy semi-transparent layer" and "Ag alloy reflective layer" as used hereunder indicate that the layers are made of $Ag_{98}Cu_1Au_1$ alloy (atom %), a thin film of which has a volume resistivity of about 35 Ω·nm. An area resistivity is obtained by dividing a volume resistivity by the film thickness.

The resistivity was measured by a four-probe method in accordance with JIS K7194.

The substrate used had grooves formed for guiding writing/retrieving light. In what follows, the parts of the grooved surface that are closer to the writing/retrieving light incidence side are called "grooves", and the other parts that are farther from that side "lands".

$ZnS-SiO_2$ has a refractive index of about 2.1 at a wavelength of 630 to 660 nm and about 2.3 at a wavelength of about 400 nm. Otherwise values shown in Reference Example hereinafter described were used in optical calculations.

Example 1

Substrate-incidence Type

Preparation of Optical Disc

On a transparent substrate made of polycarbonate and having a thickness of 0.6 mm were stacked by sputtering an Ag semi-transparent layer (18 nm), an $SiO_2$ interdiffusion-protection layer (5 nm) a $ZnS-SiO_2$ first protective layer (90 nm), a $Ge_5In_3Sb_{68}Te_{24}$ recording layer (15 nm), a $ZnS-SiO_2$ second protective layer (30 nm), an $SiO_2$ interdiffusion-protection layer (5 nm), and an Ag reflective layer (120 nm) in the order described. A protective coating layer was formed thereon of an ultraviolet-curing resin. A pair of the resulting stacks of layers formed on the respective substrates were joined together with the protective coating layers inside to prepare an optical disc. The substrate used had a spiral groove having a groove width of 0.56 μm and a groove depth of 67 nm at a pitch of 1.2 μm. The optical disc was initialized to crystallize the recording layer.

Evaluation of Reflectance

The optical disc was irradiated with writing/retrieving light (wavelength: 635 nm) from its substrate side, and the reflectance was measured. The reflectance Ra in the amorphous state (recorded state) was found higher than the reflectance Rc in the crystalline state (non-recorded state). This meant that the disc was a low-to-high medium. The crystalline state reflectance Rc was about 11% in the grooves. When recording was conducted at Pw=11 mW, the amorphous area reflectance Ra on 14T mark was about 26%. Ra−Rc was about 15%.

Writing/Retrieving Conditions

Recording characteristics were measured on an optical disc evaluation apparatus having an optical system of 635 nm in wavelength and 0.6 in NA. Writing/retrieving light was incident on the substrate side.

Recording was carried out according to a divided pulse recording method as shown in FIG. 6. The recording conditions were: a linear velocity of 4 m/s; a ratio of erase power Pe to write power Pw, Pe/Pw, of 0.5; bias power Pb of 0.8 mW, and a reference clock period T of 38.2 ns. Eight-sixteen modulation random signals (so-called EFM+modulation signals) which are used in DVD standards were recorded.

The number of division was m (=n−1) in this example. The lengthes of the second and the following writing pulse sections (Pw irradiation sections), $\alpha_i T$ ($2 \leq i \leq m$), were the same irrespective of i. The lengthes of the second to the (m−1)'th off-pulse sections (Pb irradiation sections), $\beta_i T$ ($2 \leq i \leq m-1$), were the same irrespective of i.

Retrieving was carried out at a linear velocity of 4 m/s with read power Pr of 0.8 mW.

Evaluation of Write Power Dependency of Jitter

Overwriting (direct overwriting; DOW) was conducted ten times, followed by retrieving to measure 3T space jitter (jitter in a part between 3T marks) The "part between marks (space)" is a non-recorded or erased part between marks, and the "mark" corresponds to a recorded part. The "3T space" indicates a part between marks having a length 3T. The "3T space jitter" is jitter of a part between marks having a length 3T observed in retrieving the recorded 8–16 modification signals. The measurement was made with the write power Pw being varied stepwise by 1 mW to evaluate dependency of the 3T space jitter on write power. The results obtained are shown in FIG. 7(a).

Evaluation of Repeated Overwrite Cycle (DOW Cycle) Dependency of Jitter

Overwriting were repeated under conditions of Pw=11 mW and Pe=5.5 mW, and the jitter was measured for every given number of overwrite cycles to evaluate dependency of 3T space jitter on repeated overwrite cycle (DOW cycle). The results obtained are shown in FIG. 7(b).

Figure 7A:
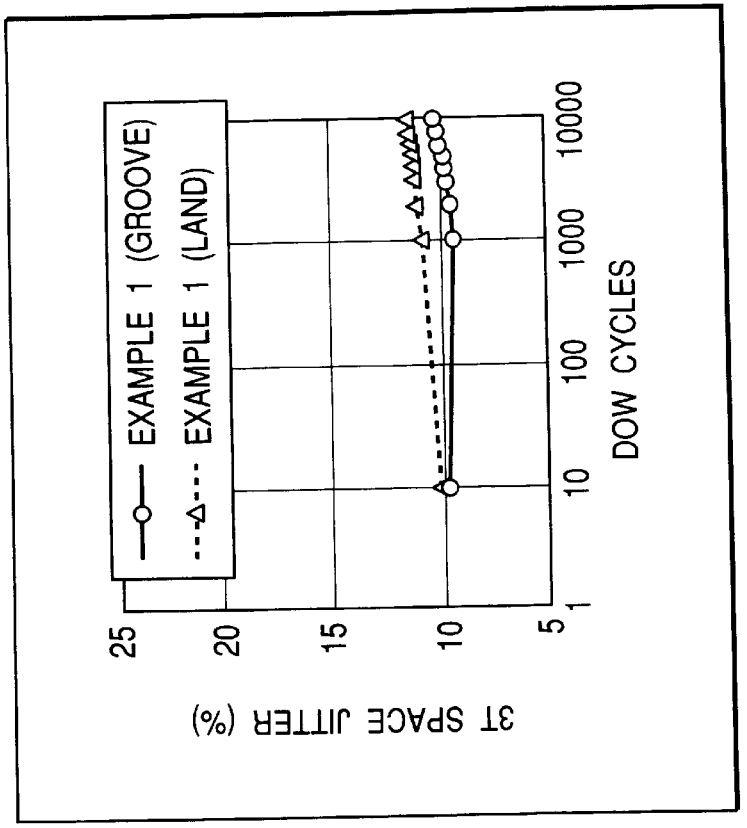
FIG. 7 is graphs showing the relationship between 3T space jitter and (a) write power or (b) repeated overwrite cycles in the optical disc of Example 1.
Figure 7B:
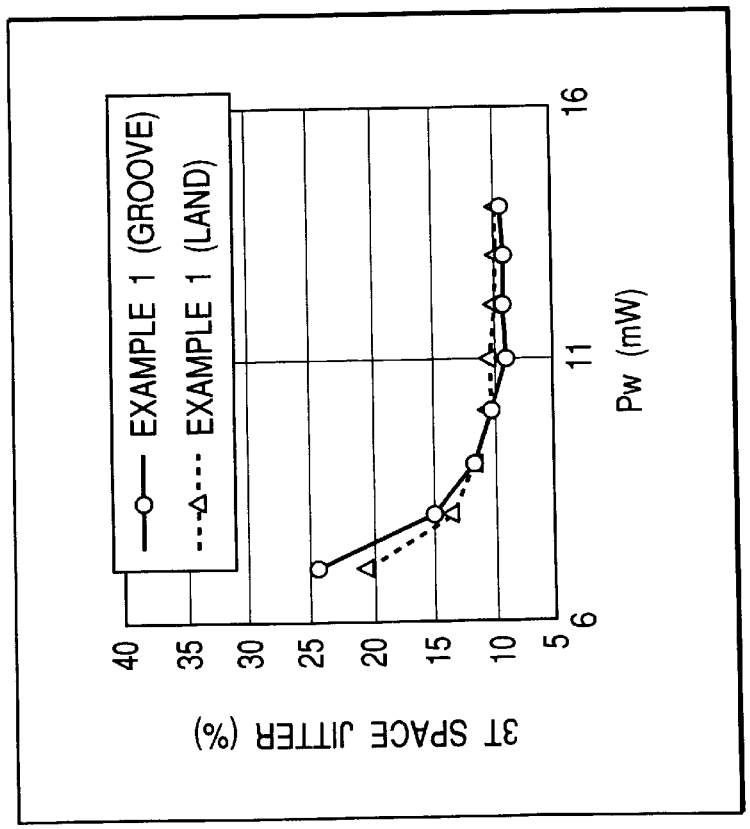

FIG. 7(a) presents 3T space jitter (vertical axis; %) vs. write power (abscissa; mW), and FIG. 7(b) is 3T space jitter (vertical axis; %) vs. repeated overwriting (abscissa). The jitter values are normalized by the reference clock period T of 38.2 ns. Evaluation was made for both on-groove writing and on-land writing.

The optical disc of Example 1 is an excellent one with a low minimum jitter value, a wide write power margin of jitter, and reduced deterioration of characteristics after repeated overwriting.

Environment Durability Test

The optical disc was subjected to an environment durability test, in which it was maintained at 80° C. and 85% RH for 100 hours. No abnormalities such as peeling occurred in the testing. The recording characteristics were measured before and after the environment durability test with the same optical disc evaluation apparatus as described above. Eight-sixteen modulation random signals were overwritten ten times on the grooves under the same writing/retrieving conditions at Pw=11 mW and Pe=5.5 mW and retrieved to measure jitter. The 3T space jitter before and after the environment durability test was 9.8% and 9.6%, respectively, indicating reduced deterioration by the environment durability test. The 3T space jitter was normalized by the reference clock period of 38.2 ns.

The above evaluation proves the optical disc of Example 1 excellent in all of repeated overwrite characteristics, write power margin, and archival stability.

Comparative Example 1

Substrate-incidence Type; with No Semi-transparent Layer

Preparation of Optical Disc

A ZnS-SiO$_2$ first protective layer (75 nm), a Ge$_5$In$_3$Sb$_{68}$Te$_{24}$ recording layer (15 nm), a ZnS-SiO$_2$ second protective layer (20 nm), an SiO$_2$ interdiffusion-protection layer (5 nm), and an Ag reflective layer (120 nm) were stacked in this order by sputtering on a 0.6 mm thick transparent substrate of polycarbonate. A protective coating layer of an ultraviolet-curing resin was formed on the stack. A pair of the resulting stacks of layers formed on the respective substrates were joined together with the protective coating layers inside to prepare an optical disc. The substrate used had the same groove configuration as in Example 1. The optical disc was initialized to crystallize the recording layer.

Evaluation of Reflectance

The optical disc had a lower Ra than an Rc, meaning that the disc was a high-to-low medium. The Rc was about 14% in the grooves. When recording was conducted at Pw=11 mW, the Ra on 14T mark was about 3%.

Jitter Evaluation

Figure 8A:
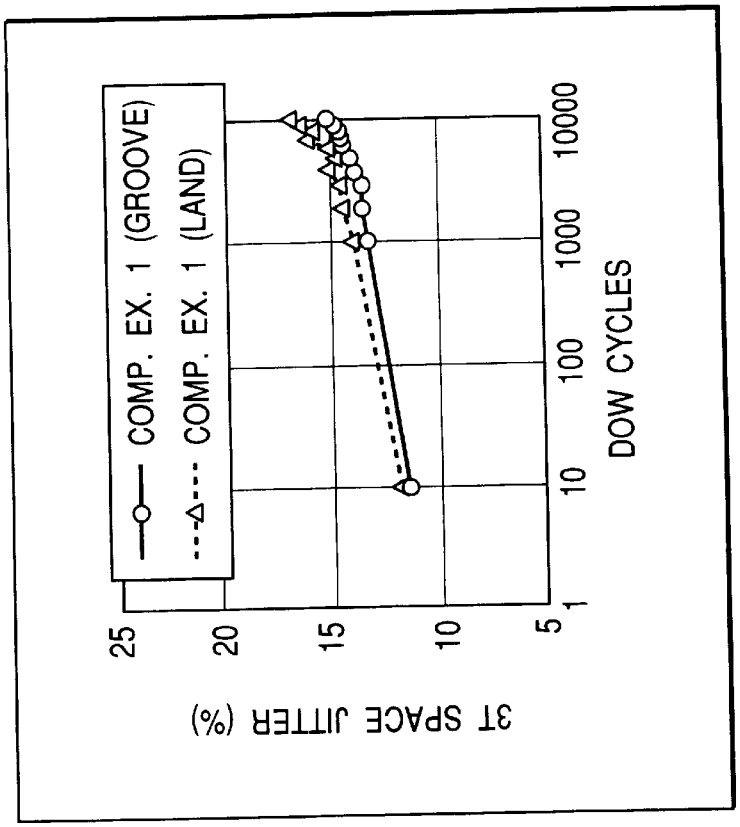
FIG. 8 is graphs showing the relationship between 3T space jitter and (a) write power or (b) repeated overwrite cycles in the optical disc of Comparative Example 1.
Figure 8B:
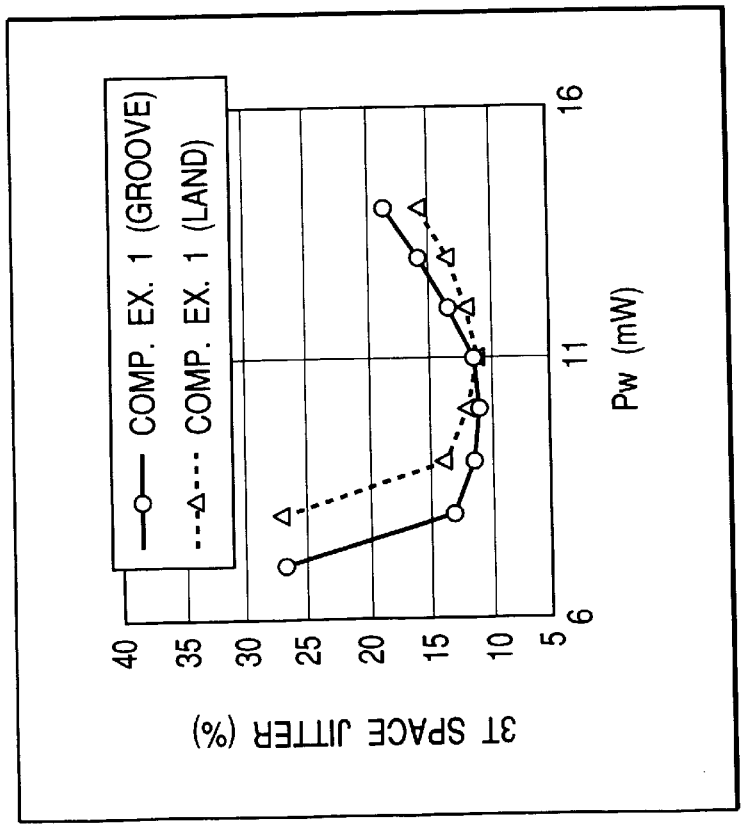

The optical disc was evaluated in the same manner as in Example 1. The results are shown in FIG. 8. The optical disc of Comparative Example 1 was inferior to that of Example 1 in all of minimum jitter value, write power margin of jitter, and characteristics after repeated overwriting.

Environment Durability Test

The same evaluation as in Example 1 was conducted. The 3T space jitter, normalized by the reference clock period, before and after the environment durability test was 11.2% and 11.5%, respectively, indicating that the deterioration due to the environment durability test was small.

Comparative Example 2

Substrate-incidence Type; with No Interdiffusion-protection Layer

An optical disc was prepared in the same manner as in Example 1, except that the interdiffusion-protection layer was not provided between the Ag semi-transparent layer (18 nm) and the first protective layer. The groove configuration of the substrate was the same as in Example 1. The resulting optical disc was initialized to crystallize the recording layer.

The optical disc had a higher Ra than an Rc by about 15%, meaning that the disc was a low-to-high medium.

Figure 9A:
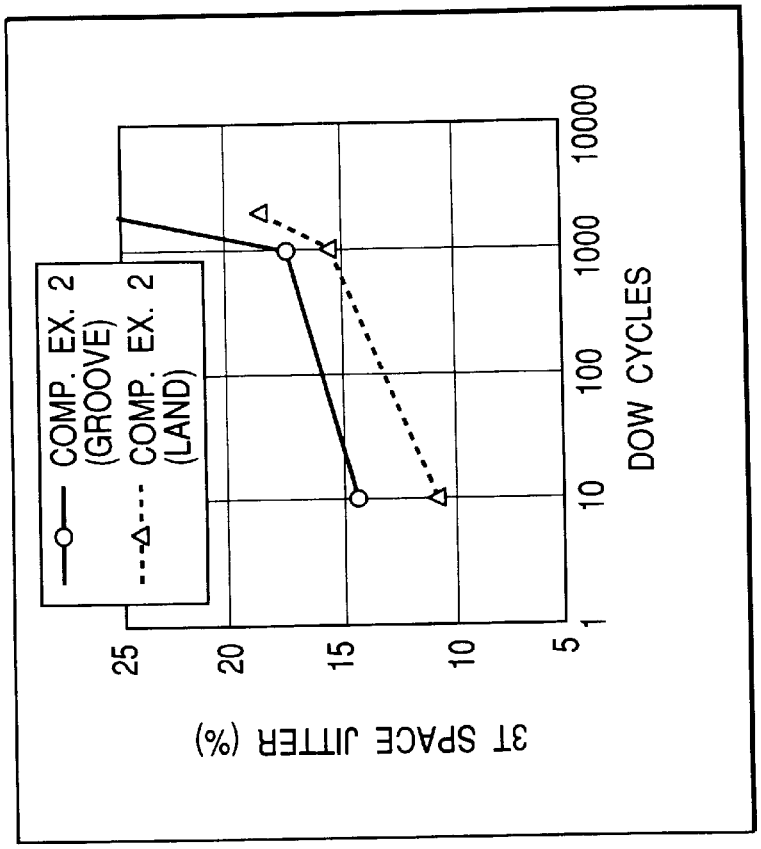
FIG. 9 is graphs showing the relationship between 3T space jitter and (a) write power or (b) repeated overwrite cycles in the optical disc of Comparative Example 2.
Figure 9B:
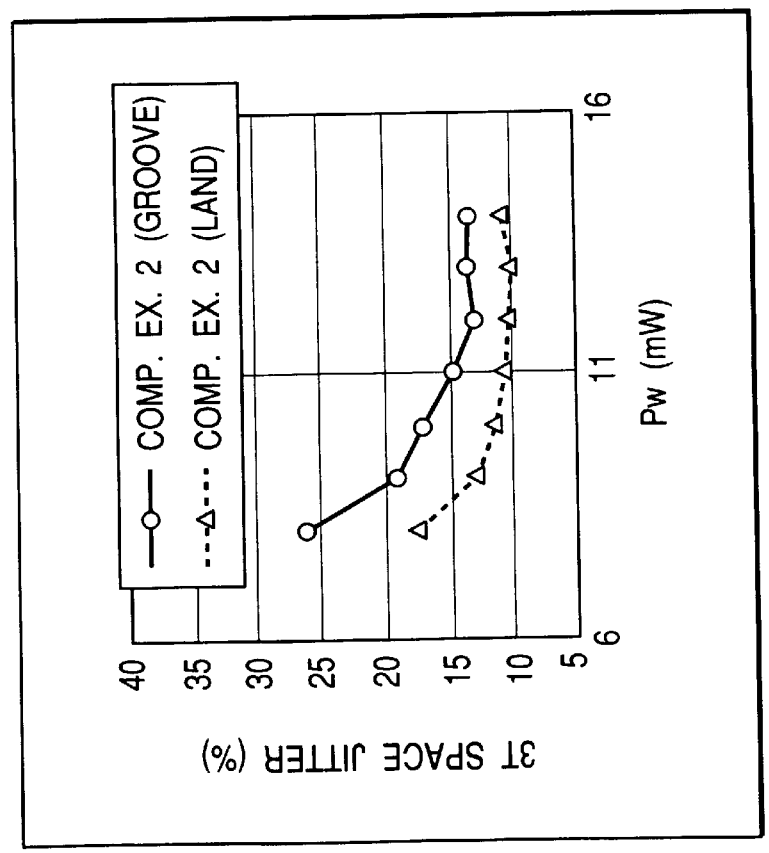

The optical disc was evaluated in the same manner as in Example 1. The results obtained are shown in FIG. 9. The optical disc of Comparative Example 1 was found inferior to that of Example 1 in minimum jitter value and characteristics after repeated overwriting. The deterioration in characteristics due to repeated overwriting was particularly conspicuous.

The optical disc was then subjected to an environment durability test, in which it was kept at 80° C. and 85% RH for 100 hours. Color change was observed in the reflective layer as a result, assumably because of denaturation of the Ag reflective layer due to diffusion of sulfur from the first protective layer.

Example 2

Substrate-incidence Type; Multi-level Recording System

Preparation of Optical Disc

An Ag semi-transparent layer (15 nm), an SiO$_2$ interdiffusion-protection layer (5 nm), a ZnS-SiO$_2$ first protective layer (25 nm), a Ge$_5$In$_3$Sb$_{68}$Te$_{24}$ recording layer (14 nm), a ZnS-SiO$_2$ second protective layer (30 nm), an SiO$_2$ interdiffusion-protection layer (5 nm), and an Ag reflective layer (100 nm) were stacked in this order by sputtering on a 0.6 mm thick transparent substrate of polycarbonate. A protective coating layer of an ultraviolet-curing resin was formed on the stack. A pair of the resulting stacks of layers formed on the respective substrates were joined together with the protective coating layers inside to prepare an optical disc. The substrate used had a spiral groove having a groove width of 0.4 μm and a groove depth of 45 nm at a pitch of 0.8 μm. The optical disc was initialized to crystallize the recording layer.

Evaluation of Reflectance

With writing/retrieving light (wavelength: 402 nm) incident upon the substrate side on the optical disc, the Ra was higher than the Rc. That is, the optical disc was of low-to-high type. The reflectances were obtained through optical calculation. The calculated Rc was 14%, and the calculated Ra was 37% (the wavelength was assumed to be 405 nm).

Evaluation of Recording Characteristics in Multi-level Recording

Multi-level recording was carried out on the optical disc of this Example according to the following principle by use of an optical disc evaluation apparatus having an optical system with a wavelength of 402 nm and an NA of 0.65. Writing/retrieving light was incident on the substrate side.

The write power was Pw, the bias power was Pb, the Pw irradiation section was tw, the Pb irradiation section was tb, the sum of tw and tb was taken as τ, and the recording linear velocity was taken as v. τ being fixed, and the ratio of tw to τ, tw/τ, was varied to change the area of amorphous marks formed in a given section (section corresponding to the product of τ and v, vτ).

The reflectance of this section is decided by the area of the amorphous marks and the area of the background crystalline state in that section. Accordingly, the reflectance is varied stepwise by changing tw/τ, stepwise. The threshold value of the reflectance is set in multiple stages, and information can be recorded in three or more levels in one section (K. Kiyono, M. Horie, T. Ohno, T. Uematsu, T. Hashizume, M. P. O'Neill, K. Balasubramanian, R. Narayan, D. Warland, and T. Zhou, *Japanese Journal of Applied Physics,* 40, 1855 (2001)).

Because an eutectic alloy system recording layer remarkably recrystallizes in re-solidification of a recording layer, it crystallizes almost completely when tb is zero, and as tb increases, the cooling effect increases to suppress recrystallization, resulting in formation of an amorphous mark of larger size. When tb/τ increases monotonously, the amorphous mark size increases until the tb/τ reaches from zero to about 70 to 80%, and meanwhile the reflectance increases monotonously. In multi-level recording, the concept of erase power does not exist.

Figure 10:
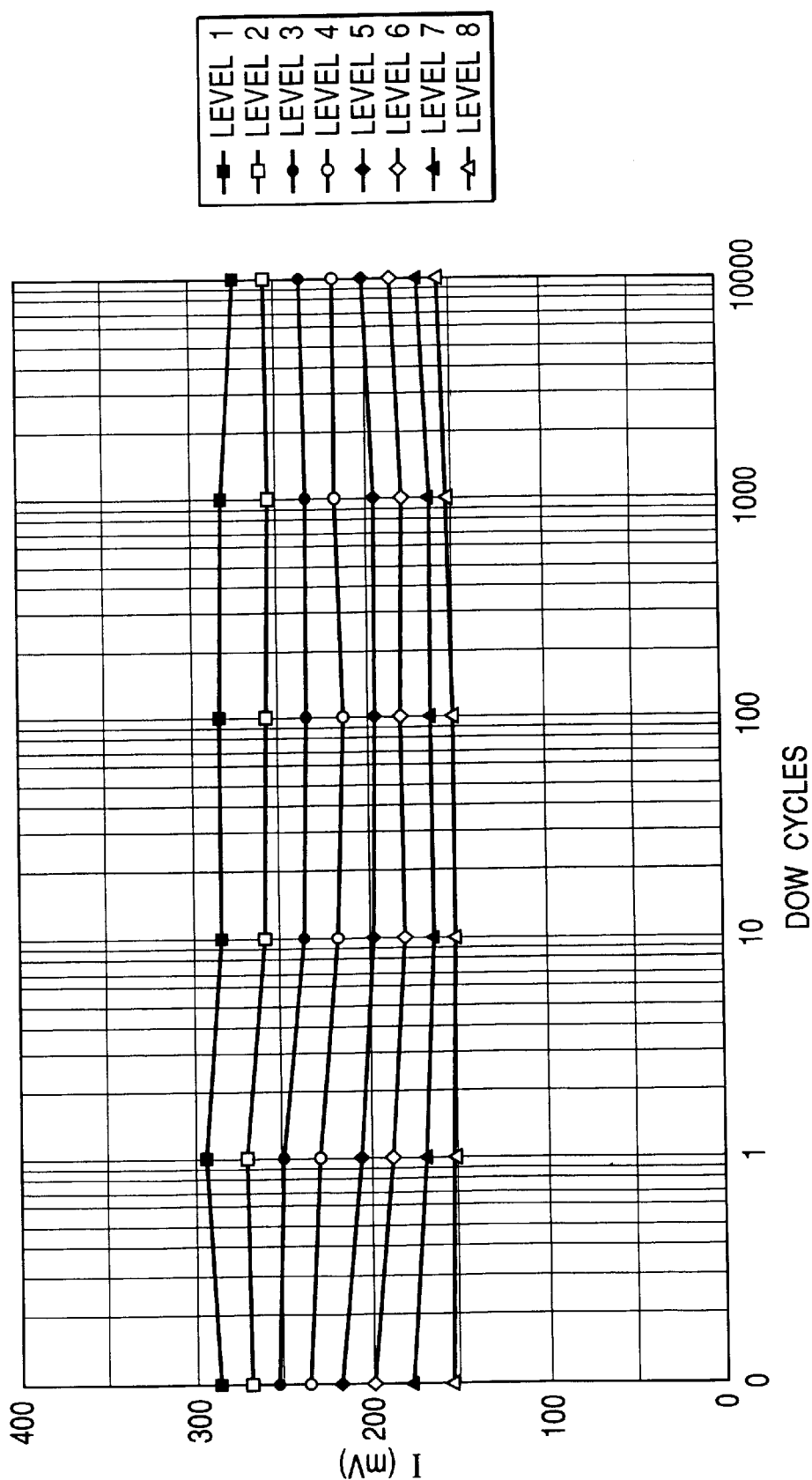
FIG. 10 is a graph showing repeated overwrite cycle dependency of reflectance in the optical disc of Example 2.

Recording was carried out under conditions: linear velocity=5 m/s, write power Pw=5.5 mW, bias power Pb=0.5 mW, τ=50 nsec, vτ=0.25 μm, while varying the tw/τ. Eight-level recording was conducted by changing the reflectance in 8 levels as shown in FIG. 10. In FIG. 10, the vertical axis shows the voltage of retrieved signals which corresponds to the reflectance.

Level 8 having the lowest reflectance is a completely crystallized state, which substantially agreed with the reflectance Rc as obtained by optical calculation. Level 1, the highest reflectance, was slightly lower than the reflectance Ra as obtained by optical calculation. The found Rc and the found Ra gave a reflectance difference of 10% or more.

Data were repeatedly overwritten on the optical disc, and the changes in reflectance of each level were observed. As shown in FIG. 10, the reflectance showed practically no changes even after 10,000 overwrite cycles.

Then, the disc was irradiated with a laser beam having write power Pw of 5.5 mW at a linear velocity of 5 m/s in a direct current mode, and the reflectance of the irradiated area was measured. Taking the reflectance of the crystalline part after initialization followed by about 10 overwrite cycles as 100%, the reflectance of the irradiated area was 100%.

Evaluation of Recording Characteristics in Two-level Recording

General two-level recording was carried out on the same disc to evaluate the recording characteristics.

A divided pulse recording method as shown in FIG. 6 was followed. Mark-length modulation recording was conducted by using an RLL (1,7) encoding system under conditions: linear velocity of 7 m/s, write power Pw of 5.1 mW, erase power Pe of 2.2 mW, bias power Pb of 0.5 mW, and 2T mark length (shortest mark length) of about 0.23 μm.

In this Example, the number of division was m (=n−1). The lengthes of the second and the following writing pulse sections (Pw irradiation sections), $\alpha_i T$ ($2 \leq i \leq m$), were the same irrespective of i. The lengthes of the second to the (m−1)'th off-pulse sections (Pb irradiation sections), $\beta_i T$ ($2 \leq i \leq m-1$), were the same irrespective of i.

Retrieving was carried out at a linear velocity of 3.1 m/s with read power Pr of 0.5 mW.

Jitter was measured for every given number of overwrite cycles, and, after binarization through an equalizer, repeated overwrite cycle (DOW cycle) dependency of data-to-clock jitter was evaluated. As a result, jitter was 9% or less, showing no increase until about 10,000 repeated overwrite cycles. The "data-to-clock jitter" is the value of fluctuation of marks and spaces of all lengths included in data normalized by the reference clock period.

Then a laser beam having write power Pw of 5.1 mW was applied to the disc at a linear velocity of 7 m/s in a direct current mode, and the reflectance of the irradiated area was measured. The reflectance of the crystalline area after initialization of the optical disc followed by about 10 overwrite cycles being taken as 100%, the reflectance of the irradiated area was 110 to 115%.

Comparative Example 3

Substrate-incidence Type; Multi-level Recording; with No Semi-transparent Layer

Preparation of Optical Disc

A $ZnS\text{-}SiO_2$ first protective layer (40 nm), a $Ge_5In_3Sb_{68}Te_{24}$ recording layer (13 nm), a $ZnS\text{-}SiO_2$ second protective layer (8 nm), an $SiO_2$ interdiffusion-protection layer (5 nm), and an Ag reflective layer (100 nm) were stacked in this order by sputtering on a 0.6 mm thick transparent substrate of polycarbonate. A protective coating layer of an ultraviolet-curing resin was formed on the stack. A pair of the resulting stacks of layers formed on the respective substrates were joined together with the protective coating layers inside to prepare an optical disc. The substrate used had a spiral groove having a groove width of 0.4 μm and a groove depth of 50 nm at a pitch of 0.8 μm. The optical disc was initialized to crystallize the recording layer.

Evaluation of Reflectance

With writing/retrieving light (wavelength: 402 nm) incident upon the substrate side of the optical disc, the Ra was lower than the Rc. That is, the optical disc was of high-to-low type. The reflectances were obtained through optical calculation. As a result thereof, the calculated Rc was 31%, and the calculated Ra was 6% (the wavelength was assumed to be 405 nm).

Evaluation of Recording Characteristics in Multi-level Recording

Figure 11:
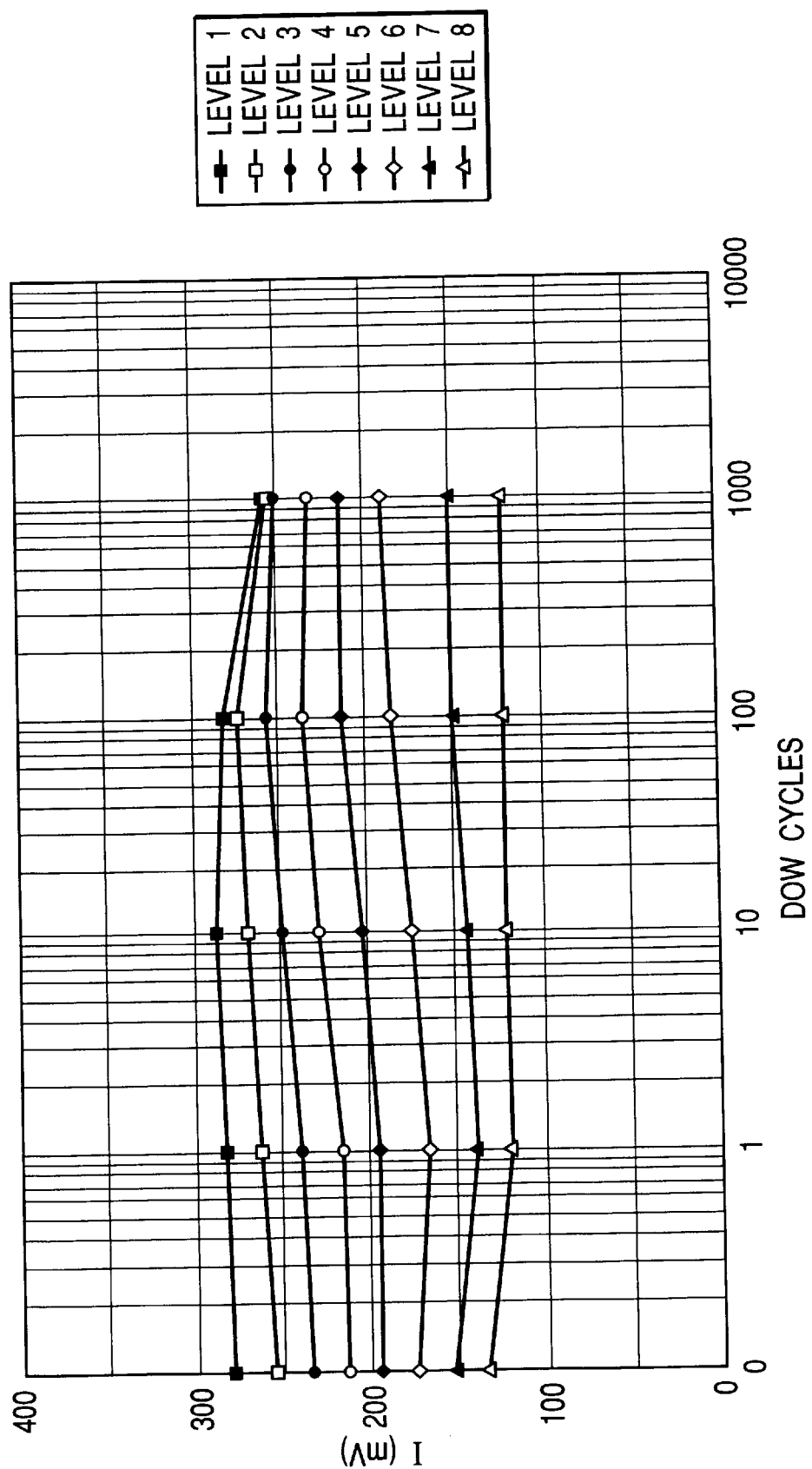
FIG. 11 is a graph showing repeated overwrite cycle dependency of reflectance in the optical disc of Comparative Example 3.

Multi-level recording was carried out on the optical disc under the same conditions as in Example 2 to evaluate the recording characteristics. Eight-level recording was conducted by changing the reflectance in 8 levels as shown in FIG. 11. In this example, the lowest reflectance and the highest one were approximately equal to those in Example 2, but level 1, the highest reflectance, corresponds to a completely crystallized state.

The optical disc was subjected to repeated overwriting, and changes in reflectance on each level were observed. As shown in FIG. 11, the reflectance of level 1 showed an appreciable reduction after 100 repeated overwrite cycles and fell into a state unfit for 8-level multi-level recording.

Evaluation of Recording Characteristics in Two-level Recording

General two-level recording was carried out on the optical disc to evaluate the recording characteristics.

Jitter was measured for every given number of overwrite cycles to evaluate dependency of data-to-clock jitter on repeated overwrite cycles (DOW cycles). As a result, jitter was maintained at 9% or less until about 2000 repeated overwrite cycles with no substantial increase but abruptly increased thereafter.

Since a slight reduction in reflectance is not directly reflected on jitter in a general two-level recording scheme, this optical disc was serviceable for 1000 or more overwrite cycles. In multi-level recording, however, since deterioration due to reduction of reflectance is hardly permissible, this disc was usable only for about 100 overwrite cycles. Accordingly, the medium of the present invention is especially effective for multi-level recording method.

Example 3

Film-side-incidence Type; AlN Protective Layer

An Ag98Cu$_1$Au$_1$ alloy reflective layer (80 nm), an SiO$_2$ interdiffusion-protection layer (5 nm), a ZnS-SiO$_2$ second protective layer (30 nm), a Ge$_3$In$_5$Sb$_{67}$Te$_{25}$ recording layer (12 nm), an AlN first protective layer (30 nm), and an Ag$_{98}$Cu$_1$Au$_1$ semi-transparent layer (15 nm) were stacked in this order by sputtering on a 1.1 mm thick transparent substrate of polycarbonate. AlN is higher in thermal conductivity than that of ZnS-SiO$_2$. A transparent coating layer (cover layer) having a thickness of about 100 μm was formed of an ultraviolet-curing resin on the stack to prepare an optical disc. The substrate used had a spiral groove having a groove width of 0.32 μm and a groove depth of 40 nm at a pitch of 0.66 μp. The optical disc was initialized to crystallize the recording layer.

With writing/retrieving light (wavelength: 402 nm) incident upon the substrate side of the optical disc, the Ra was higher than the Rc. That is, the optical disc was of low-to-high type. The reflectances were obtained through optical calculation. The calculated Rc was 12%, and the calculated Ra was 35% (the wavelength was assumed to be 405 nm).

The recording characteristics of the resulting optical disc were measured with an optical disc evaluation apparatus having an optical system with a wavelength of 402 nm and an NA of 0.85. Writing/retrieving light was incident on the film side.

Writing was carried out according to the same divided pulse recording method as in Example 1. Mark-length modulation recording was conducted by using an RLL (1,7) encoding system under the following conditions: linear velocity of 5.7 m/s, write power Pw of 3.7 mW, erase power Pe of 1.7 mW, bias power Pb of 0.3 mW, 2T mark length (shortest mark length) of 0.173 μm, and reference clock frequency (1/T) of 66 MHz.

Retrieving was carried out with read power Pr of 0.3 mW at a linear velocity of 5.7 m/s.

Jitter was measured for every given number of overwrite cycles, and, after binarization through an equalizer, repeated overwrite cycle (DOW cycle) dependency of data-to-clock jitter was evaluated. As a result, the jitter did not exceed 10% until about 50,000 repeated overwrite cycles with an increase being less than 1%.

Example 4

Film-side-incidence Type

An Ag$_{98}$Cu$_1$Au$_1$ alloy reflective layer (80 nm), an SiO$_2$ interdiffusion-protection layer (5 nm), a ZnS-SiO$_2$ second protective layer (30 nm), a Ge$_3$In$_5$Sb$_{67}$Te$_{25}$ recording layer (12 nm), a ZnS-SiO$_2$ first protective layer (25 nm), an SiO$_2$ interdiffusion-protection layer (5 nm), and an Ag$_{98}$Cu$_1$Au$_1$ semi-transparent layer (15 nm) were stacked in this order by sputtering on a 1.1 mm thick transparent substrate of polycarbonate. An about 100 μm thick transparent coating layer (cover layer) of an ultraviolet-curing resin was formed on the stack to prepare an optical disc. The substrate used had a spiral groove having a groove width of 0.32 μm and a groove depth of 40 nm at a pitch of 0.66 μm. The optical disc was initialized to crystallize the recording layer.

With writing/retrieving light (wavelength: 402 nm) incident upon the substrate side of the optical disc, the Ra was higher than the Rc. That is, the optical disc was of low-to-high type. The reflectances were obtained through optical calculation. The calculated Rc was 12%, and the calculated Ra was 36% (the wavelength was assumed to be 405 nm).

The recording characteristics of the resulting optical disc were measured with an optical disc evaluation apparatus having an optical system with a wavelength of 402 nm and an NA of 0.85. Writing/retrieving light was incident on the film side.

Writing was carried out according to the same divided pulse recording method as in Example 1. Mark-length modulation recording was conducted by using an RLL (1,7) encoding system under the following conditions: linear velocity of 5.7 m/s, 2T mark length (shortest mark length) of 0.173 μm, and reference clock frequency (1/T) of 66 MHz.

Retrieving was carried out with read power Pr of 0.3 mW at a linear velocity of 5.7 m/s.

Overwriting was repeated 10 times, followed by retrieving to measure data-to-clock jitter. Measurement was repeated while varying write power Pw, etc. As a result, the jitter reached its minimum, which was about 8%, under conditions of Pw=3.5 mW, Pe=1.7 mW, and Pb=0.3 mW.

Then, Pw was varied with Pb and Pe fixed. As a result, jitter was about 9% or less in a Pw range of 3.4 mW±0.4 mW.

When writing/retrieving was further conducted under conditions of write power Pw=3.4 mW, erase power Pe=1.7 mW, and a bias power Pb=0.3 mW, data-to-clock jitter was found satisfactory, being 9% or less. When overwriting was repeated under the same conditions, an increase of jitter was less than 1% until about 50,000 repeated overwrite cycles.

Then a laser beam having write power Pw of 3.4 mW was applied to the disc at a linear velocity of 5.7 m/s in a direct current mode, and the reflectance of the irradiated area was measured. Taking the reflectance of the crystalline area after initialization followed by about 10 overwrite cycles as 100%, the reflectance of the irradiated area was 114%.

Comparative Example 4

Film-side-incidence Type; with No Semi-transparent Layer

An Ag$_{98}$Cu$_1$Au$_1$ alloy reflective layer (80 nm), an SiO$_2$ interdiffusion-protection layer (3 nm), a ZnS-SiO$_2$ second protective layer (3 nm), a Ge$_3$In$_5$Sb$_{67}$Te$_{25}$ recording layer (12 nm), and a ZnS-SiO$_2$ first protective layer (35 nm) were stacked in this order by sputtering on a 1.1 mm thick transparent substrate of polycarbonate. An about 100 μm thick transparent coating layer (cover layer) of an ultraviolet-curing resin was formed on the stack to prepare an optical disc. The substrate used had a spiral groove having a groove width of 0.32 μm and a groove depth of 40 nm at a pitch of 0.66 μm. The optical disc was initialized to crystallize the recording layer.

With writing/retrieving light (wavelength: 402 nm) incident upon the substrate side of the optical disc, the Ra was lower than the Rc. That is, the optical disc was of high-to-low type. The reflectances were obtained through optical calculation. The calculated Rc was 32%, and the calculated Ra was 7% (the wavelength was assumed to be 405 nm).

The resulting optical disc was evaluated under the same conditions as in Example 4.

Retrieving was carried out with read power Pr of 0.3 mW at a linear velocity of 5.7 m/s.

Overwriting was repeated 10 times, followed by retrieving to measure data-to-clock jitter. Measurement was repeated while varying write power Pw, etc. As a result, the jitter reached its minimum, which was about 9%, under power conditions of Pw=3.8 mW, Pe=1.7 mW, and Pb=0.3 mW.

Then, Pw was varied with Pb and Pe fixed. As a result, jitter was about 10% or less in a Pw range of 3.8 mW±0.4 mW.

When writing/retrieving was further conducted under conditions of write power Pw=3.4 mW, erase power Pe=1.7 mW, and a bias power Pb=0.3 mW, data-to-clock jitter was found satisfactory, being 9% or less. Nevertheless, when overwriting was repeated under the same conditions, the jitter increased considerably after about 2000 repeated overwrite cycles.

Reference Example

The following presents examples of calculations for optical and thermal characteristics of the media according to the invention and conventional media.

It has been described that Ra−Rc≧15% is preferred in the present invention as being a high contrast, which is based on measured values. This relationship approximately corresponds to Ra−Rc≧20% in calculated values. In what follows, specific layer structures with the thicknesses of its specific layers varied were evaluated based on whether or not optical characteristics represented by Ra−Rc≧20% in calculated values were obtained (i.e., whether the contrast was high or low).

The method of calculation is a common technique that takes an optical multiple interference effect into consideration as described, e.g., in H. A. Macleod, Kougaku Hakumaku, Nikkan Kogyo Shinbun, Nov. 30, 1989. Writing/retrieving light having a wavelength of 405 nm was assumed. All the media tested are low-to-high media.

The recording layers and their complex refractive indices (found) were as follows.
Recording layer A: $In_3Ge_5Sb_{69}Te_{23}$
  Complex refractive index in a crystalline state: 1.35–3.34i
  Complex refractive index in an amorphous state: 2.46–2.90i
Recording layer B: $Ge_2Sb_2Te_5$
  Complex refractive index in a crystalline state: 2.2–3.3 i
  Complex refractive index in an amorphous state: 3.1–2.1i The first and the second protective layers were made of a dielectric, had a refractive index of 2.32, and showed no absorption. Protective layers having such a refractive index include those mainly comprising ZnS, tantalum oxide, niobium oxide, yttrium oxysulfide, titanium oxide, etc.

$SiO_2$ used to make the interdiffusion-protection layer had a refractive index of 1.6 (found).

In Table 1 are shown complex refractive indices (n-ik) of Ag, Au, Cu and Al for different wavelengths from the literature (*Handbook of Optical Constants of Solids*, edited by Edward D. Palik, Academic Press, Inc., Orlando, Fla., USA (1985)). The wavelengths shown contain errors of about ±10 nm.

TABLE 1

| Wavelength | 400 nm | | 650 nm | |
| --- | --- | --- | --- | --- |
| | n | k | n | k |
| Ag | 0.173 | 1.95 | 0.14 | 4.15 |
| Au | 1.66 | 1.96 | 0.166 | 3.15 |
| Cu | 1.18 | 2.21 | 0.21 | 3.67 |
| Al | 0.49 | 4.86 | 1.47 | 7.79 |

Alloys and their complex refractive indices (found) were as follows.
Ag alloy: 0.089–2.03i
Au alloy: 1.66–1.96i
Cu alloy: 1.18–2.21i
Al alloy: 0.39–3.62i The reflective layer was made thin such that transmitted light might be negligible. Within a thickness range of from 100 to 200 nm, there is no appreciable optical difference.

The stack had a transparent substrate having a refractive index of 1.56 on the writing/retrieving light incidence side. The thickness of the substrate was made sufficiently greater than the coherent length of an incident laser beam so that multiple interference might not occur within the substrate. Accordingly, light was to enter multi-layers from a medium having a refractive index of 1.56 on calculations.

(1) First protective layer/recording layer/second protective layer/Ag alloy reflective layer (light was incident on the first protective layer side)

This layer structure is widely used in rewritable CDs (CD-RWs), which will be referred to simply as a quadri-layer structure.

Recording layer A was used as the recording layer. The thickness of the recording layer was varied. Ra−Rc was obtained by optical calculations while varying the thicknesses of the first and second protective layers for each of the recording layer thicknesses. The results obtained are depicted in contours in FIG. 12. In the FIGS., (a), (b), (c), and (d) are cases of the recording layers with a thickness of 5, 10, 15 and 20 nm, respectively. In each of them the region providing Ra−Rc≧20%, i.e., a high-contrast region is indicated by slant lines. The same applies hereinafter.

Figure 13:
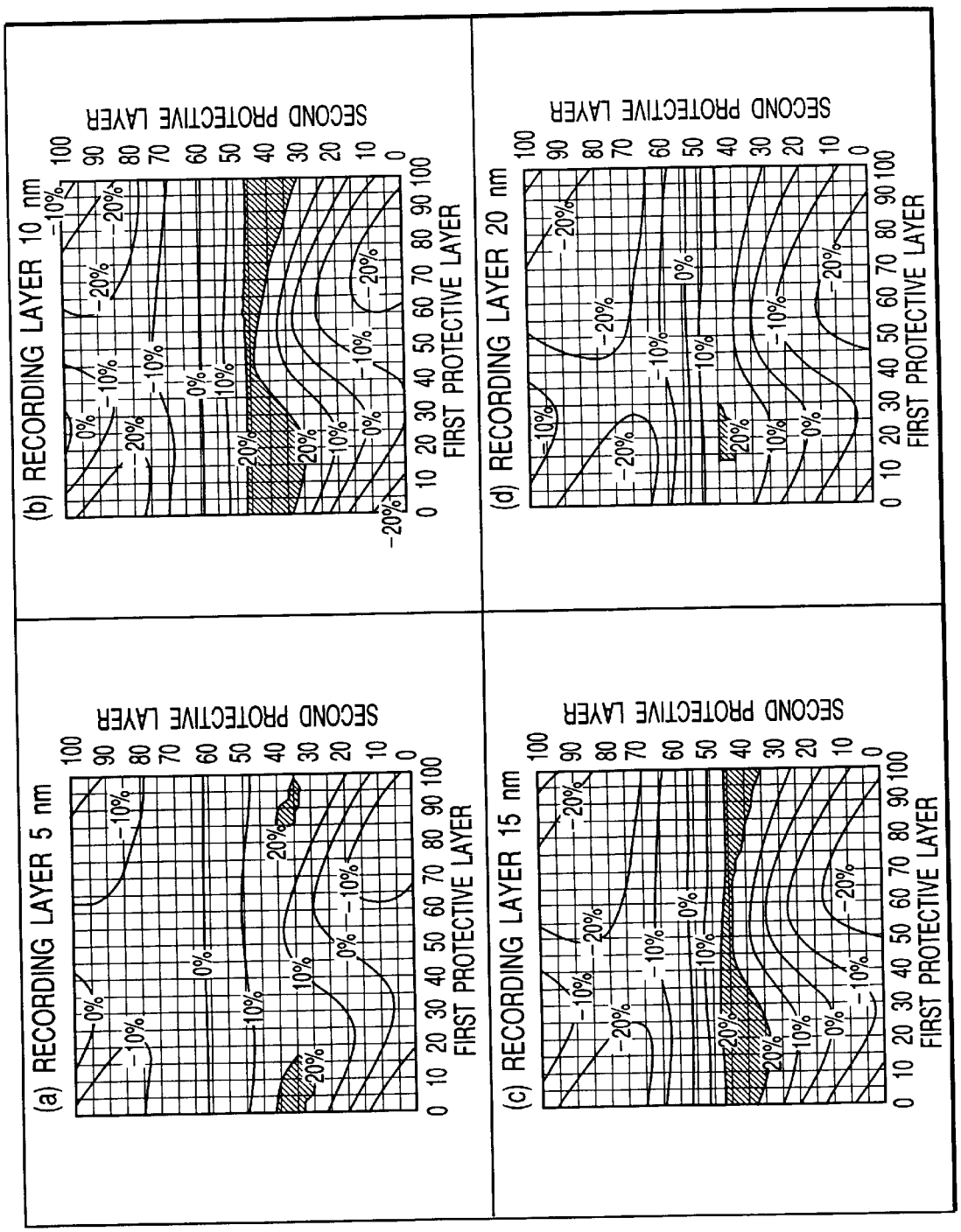
FIG. 13 is an example of optical calculations of Ra–Rc in Reference Example (1).

Recording layer B was then used. The thickness of the recording layer was varied. Ra−Rc was obtained by optical calculations while varying the thicknesses of the first and second protective layers for each of the recording layer thicknesses. The results obtained are depicted in FIG. 13 as contour maps.

Figure 12:
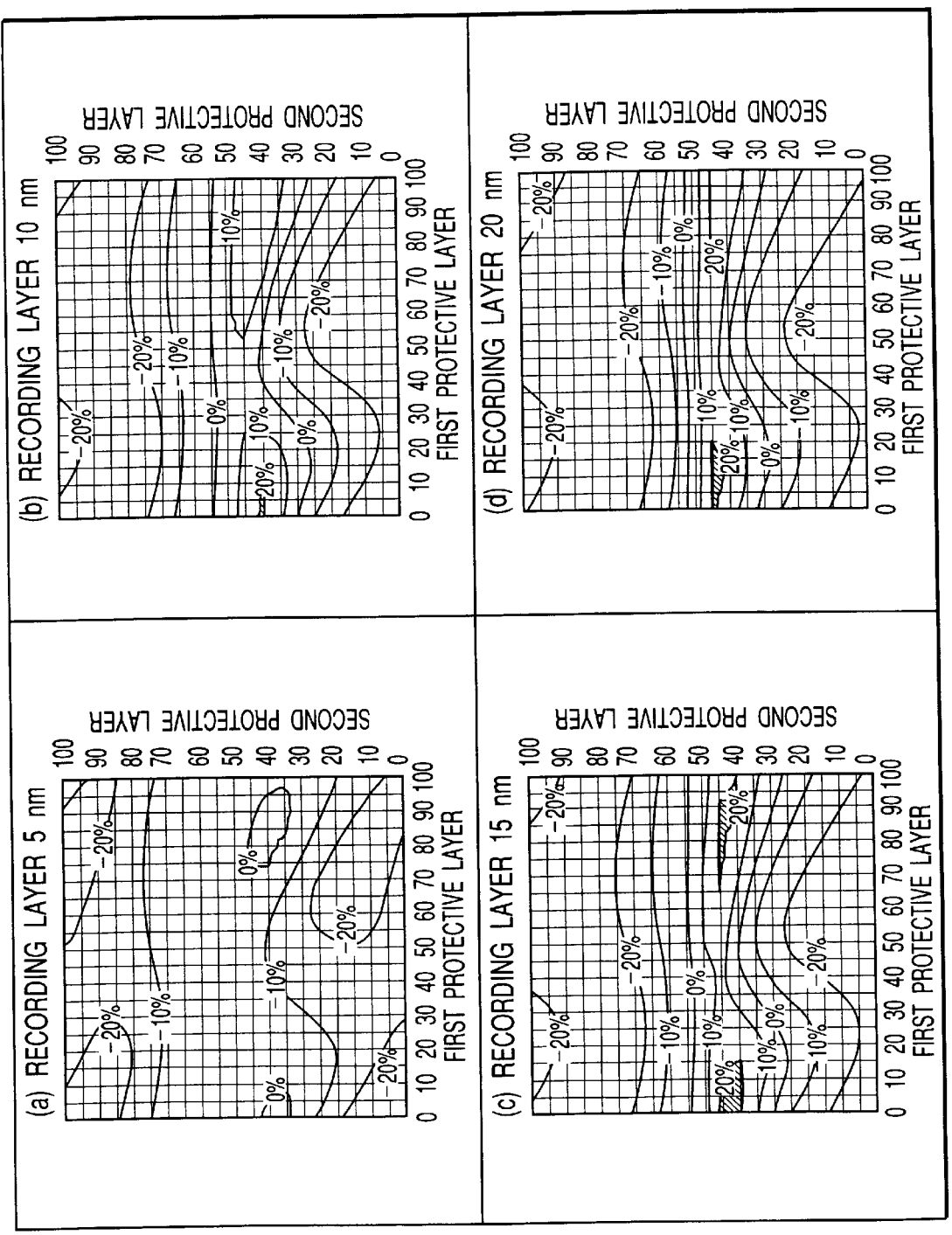
FIG. 12 is an example of optical calculations of Ra–Rc in Reference Example (1).

As shown in FIG. 12, recording layer A provides an extremely narrow high-contrast region with almost no thickness margin, suggesting practical infeasibility. On the other hand, as shown in FIG. 13, recording layer B provides some high-contrast region in the vicinity of 40 nm thickness of the first protective layer.

Figure 14:
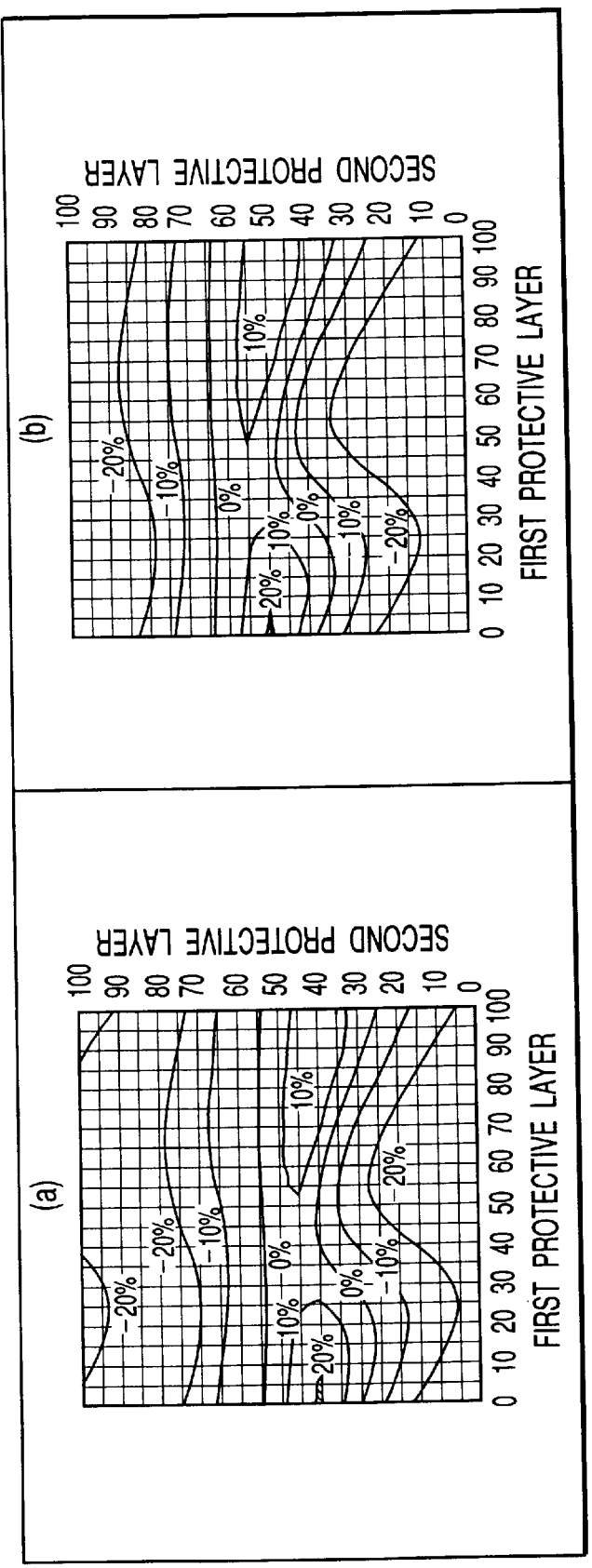
FIG. 14 is an example of optical calculations of Ra–Rc in Reference Example (1).

FIG. 14 shows the results when recording layer A having a thickness of 12 nm was used and the reflective layer was made of (a) the Ag alloy or (b) the Al alloy. Little difference is seen between the two contour maps, and each of them shows substantially no high-contrast regions.

In short, even when applied to a conventional low-to-high medium having a quadri-layer structure with no semi-transparent layer, recording layer B provides a region for obtaining a high contrast, whereas recording layer A virtually fails to obtain a high contrast with this layer design.

(2) Semi-transparent layer/first protective layer/recording layer A/second protective layer/Ag alloy reflective layer (light was incident from the semi-transparent layer side)

Figure 15:
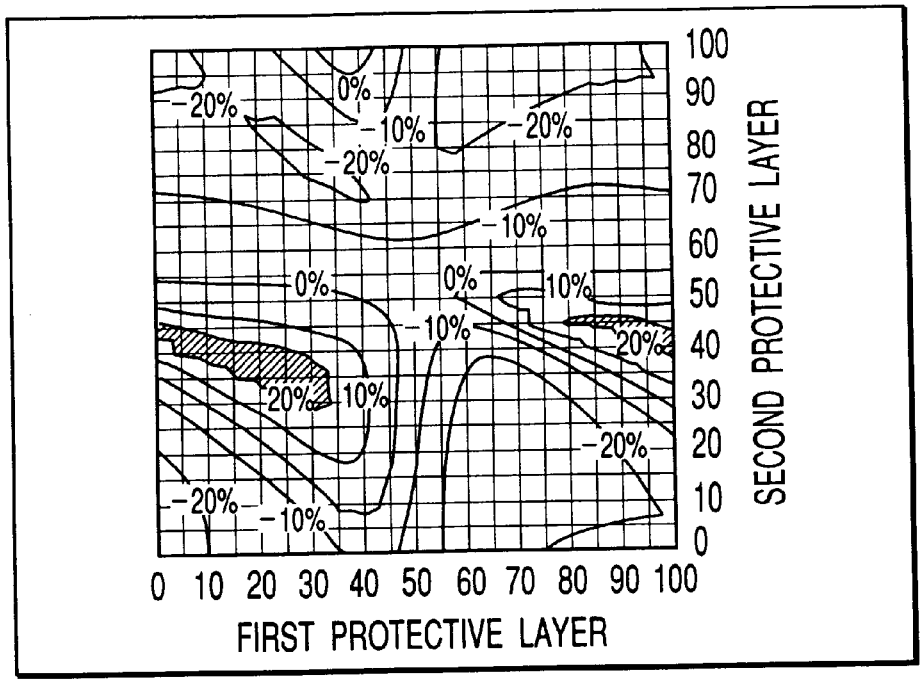
FIG. 15 is an example of optical calculations of Ra–Rc in Reference Example (2).
Figure 16:
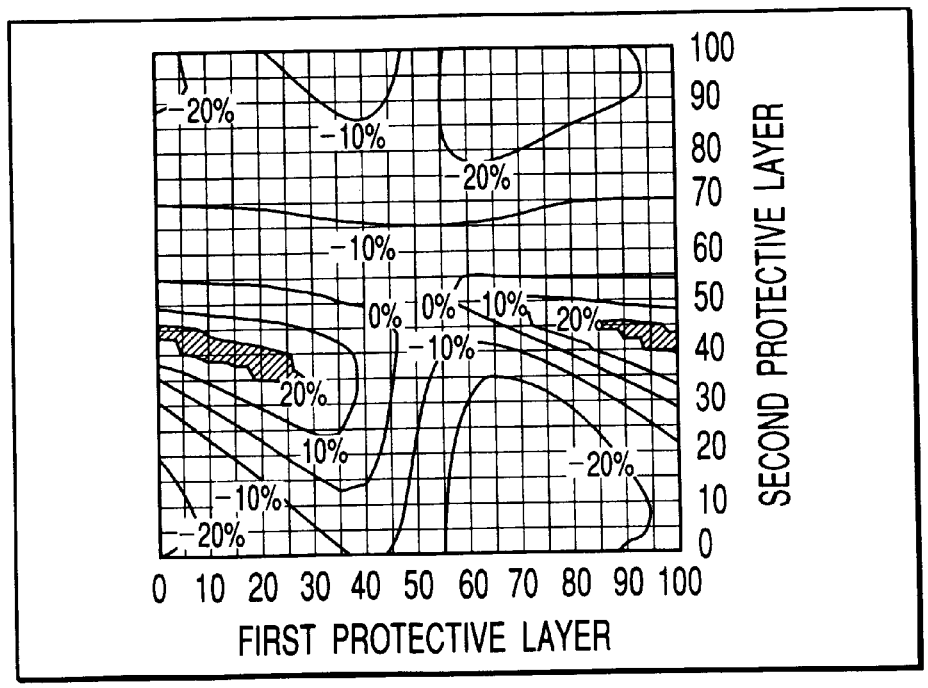
FIG. 16 is an example of optical calculations of Ra–Rc in Reference Example (2).

The semi-transparent layer was formed of the Ag alloy to a thickness of 15 nm (corresponding to the embodiment of the present invention). The thickness of the recording layer was fixed at 12 nm, and the thicknesses of the first and second protective layers were varied. Ra–Rc was obtained by optical calculations. The results obtained are plotted in contour lines in FIG. 15. Optical calculations were conducted in the same manner, except for making the semi-transparent layer of the Al alloy to a thickness of 5 nm. The results obtained are shown in FIG. 16.

In each case, a high contrast can be achieved in the vicinity of the second protective layer thickness of 40 nm. In other words, in order for the Al alloy semi-transparent layer to provide optical characteristics equal to those obtained by the Ag alloy semi-transparent layer, it is necessary to make its thickness considerably thin. However, the heat dissipation effect expected of the Al alloy with a thickness of 5 nm is considered insubstantial.

Figure 17:
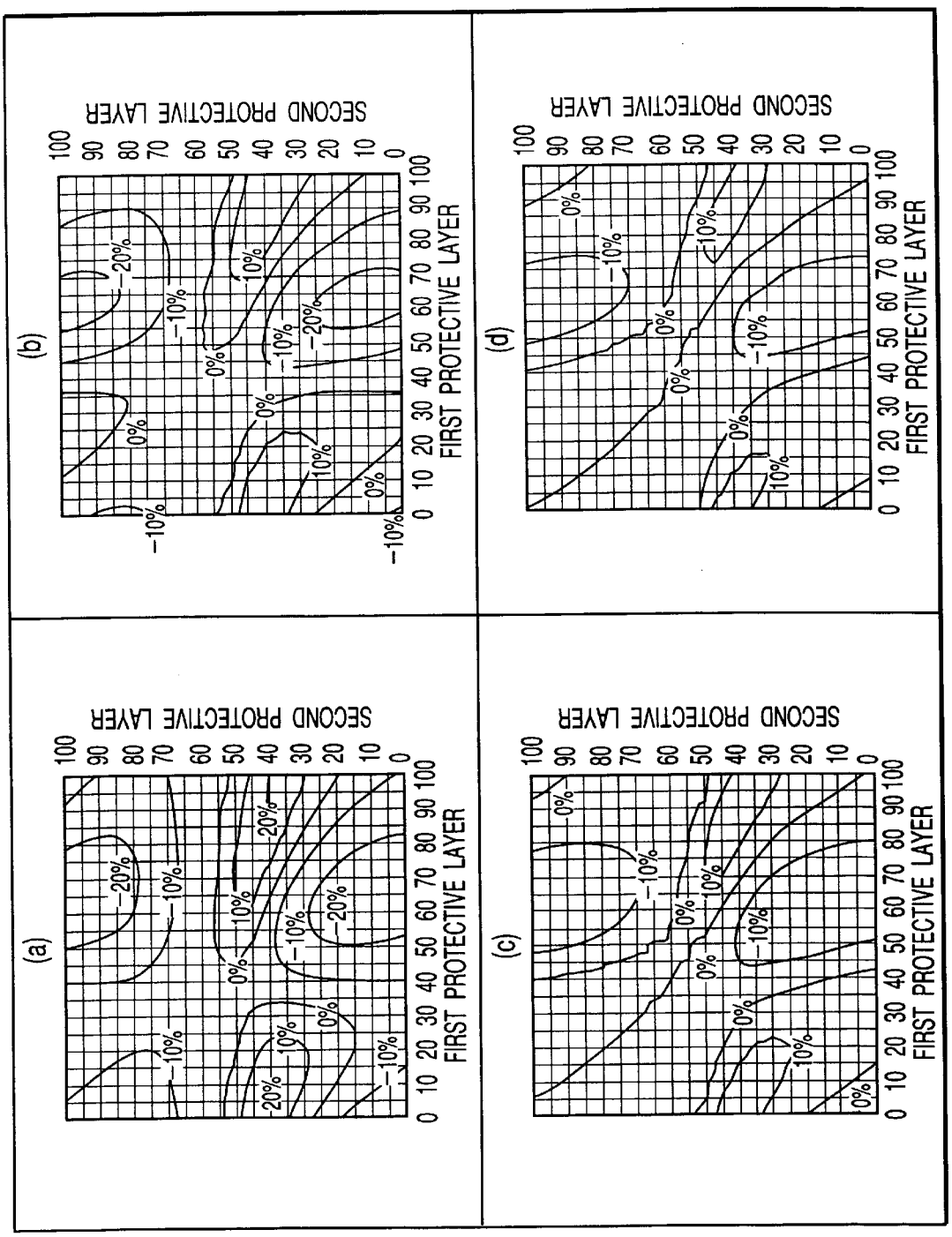
FIG. 17 is an example of optical calculations of Ra–Rc in Reference Example (2).
Figure 18:
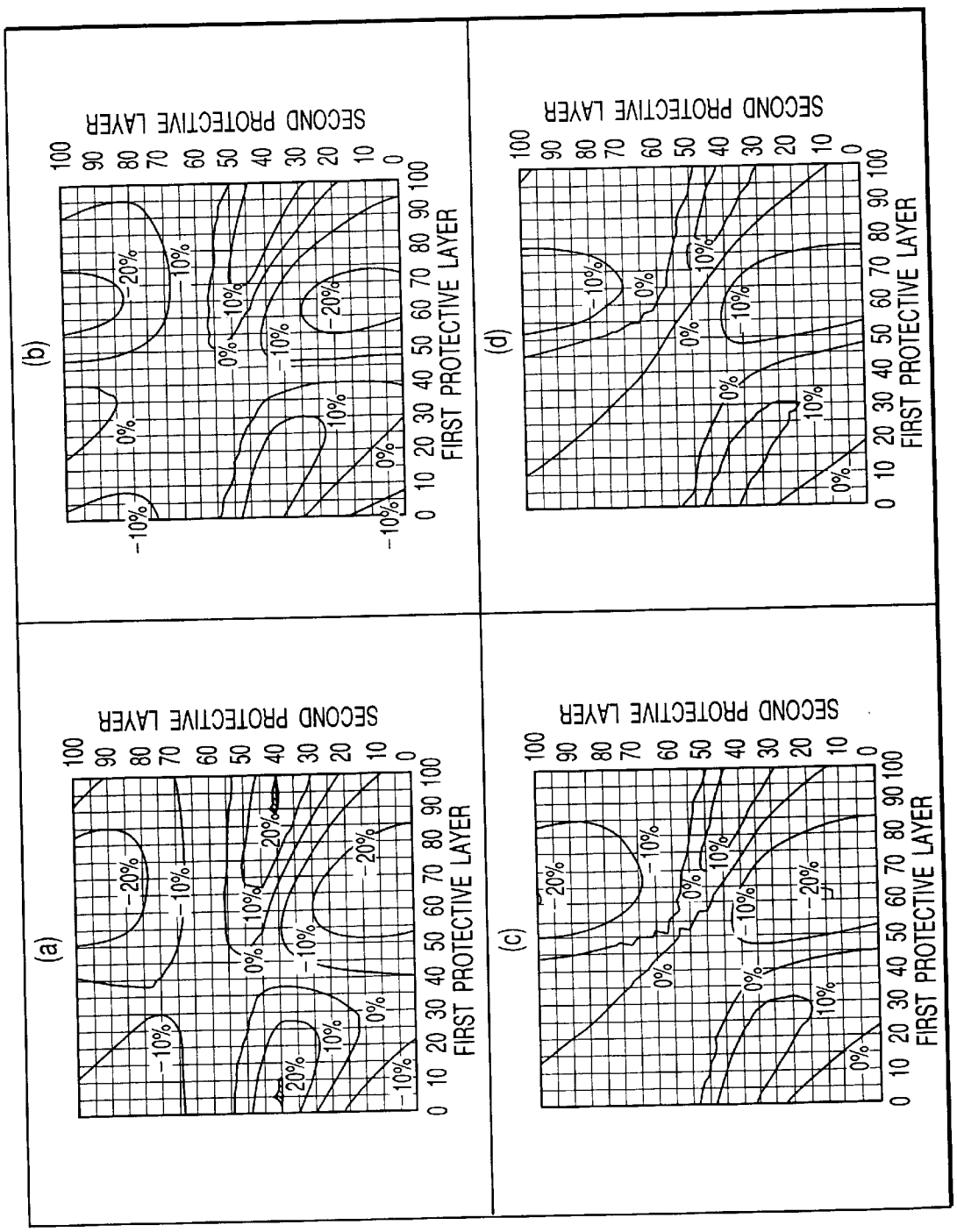
FIG. 18 is an example of optical calculations of Ra–Rc in Reference Example (2).
Figure 19:
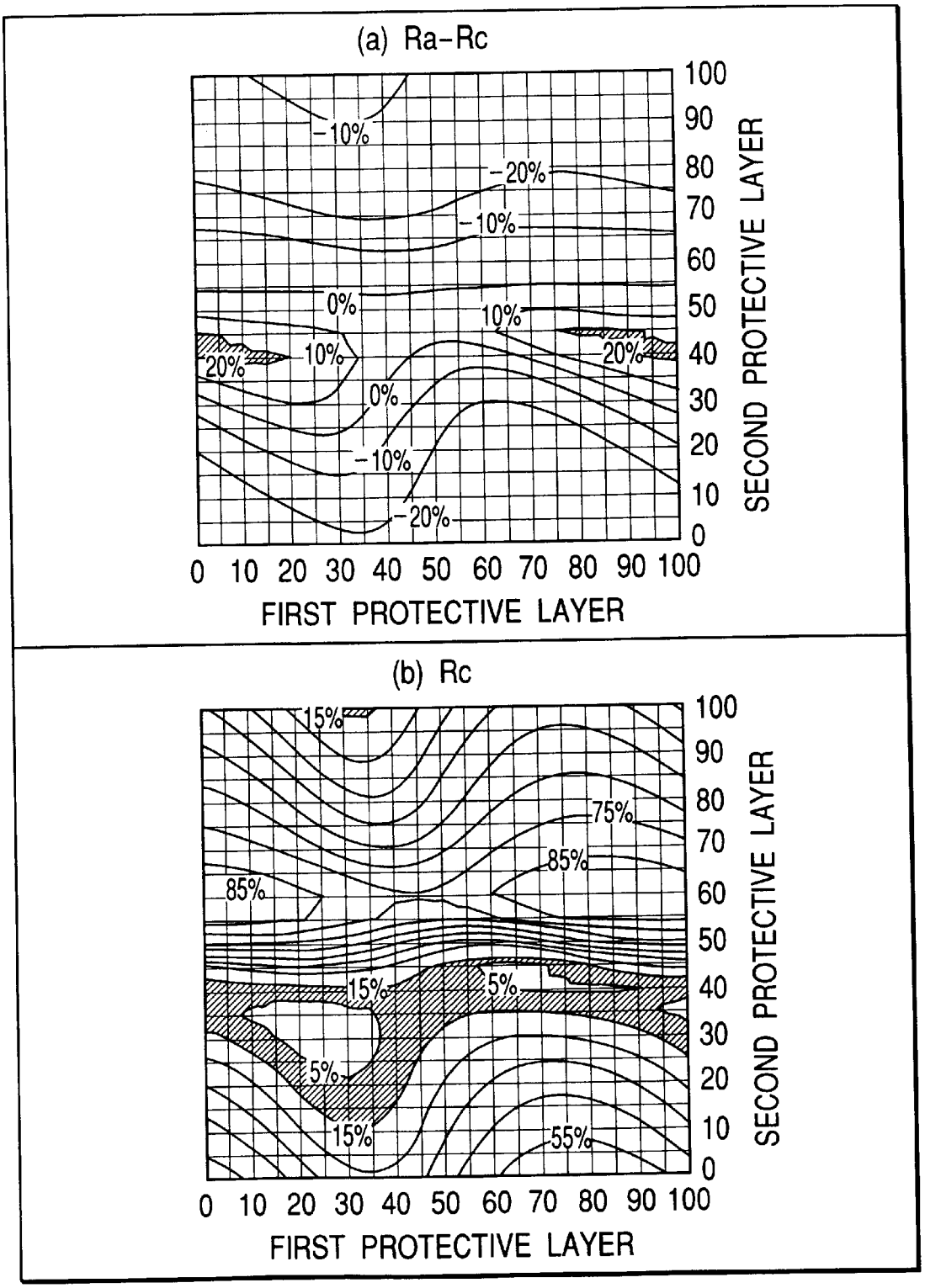
FIG. 19 is an example of optical calculations of Ra–Rc and Rc in Reference Example (3).
Figure 20:
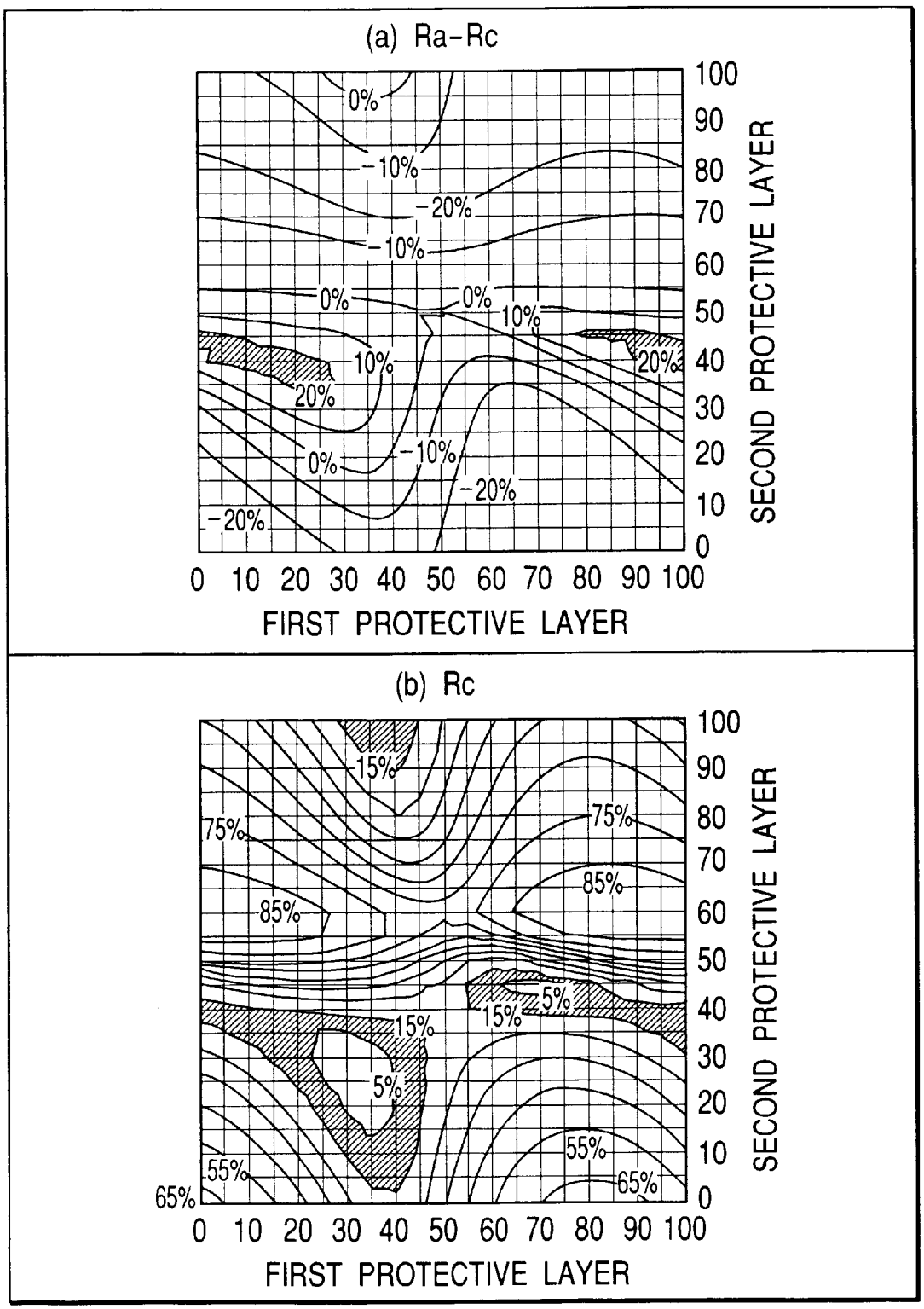
FIG. 20 is an example of optical calculations of Ra–Rc and Rc in Reference Example (3).
Figure 21:
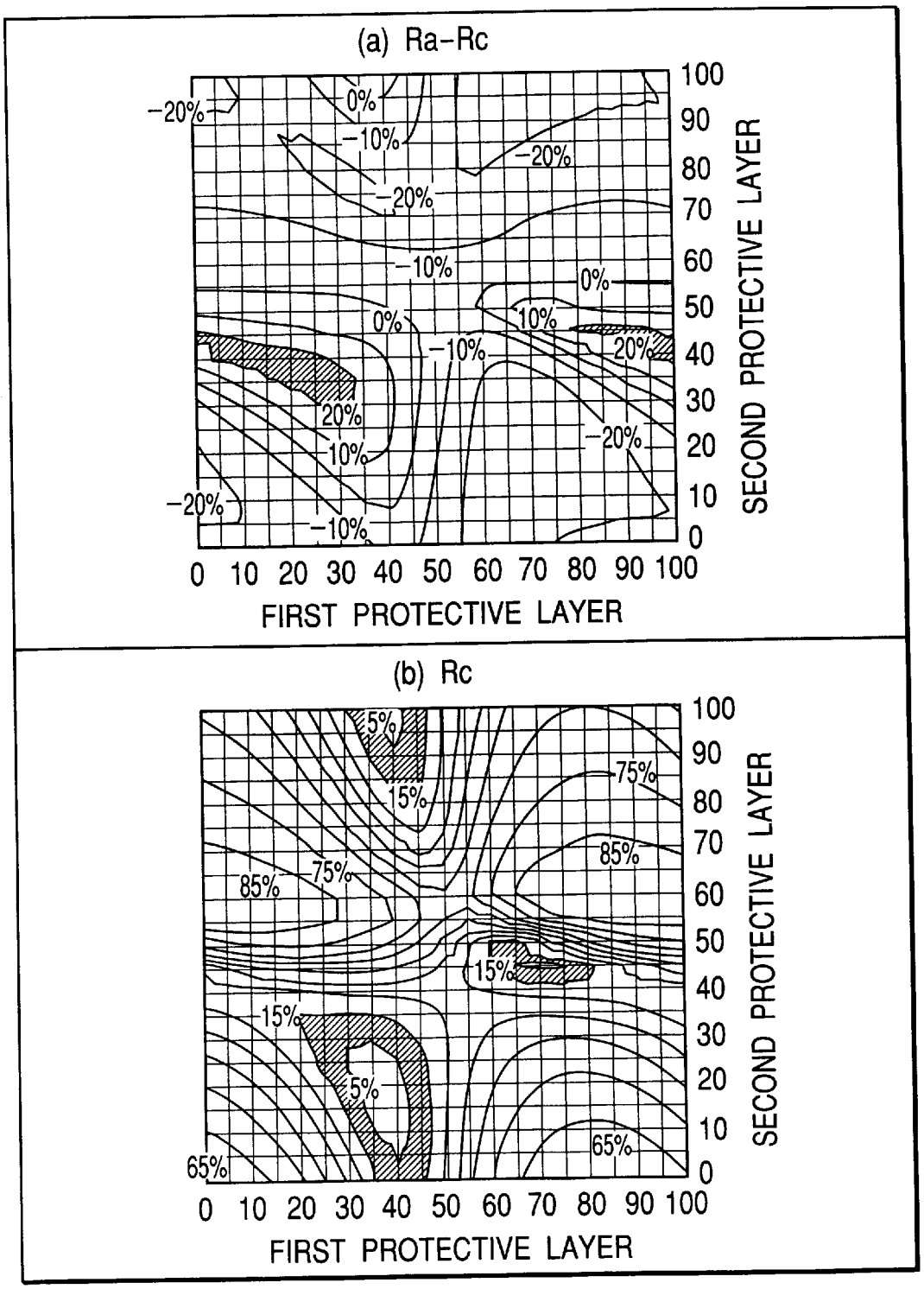
FIG. 21 is an example of optical calculations of Ra–Rc and Rc in Reference Example (3).
Figure 22:
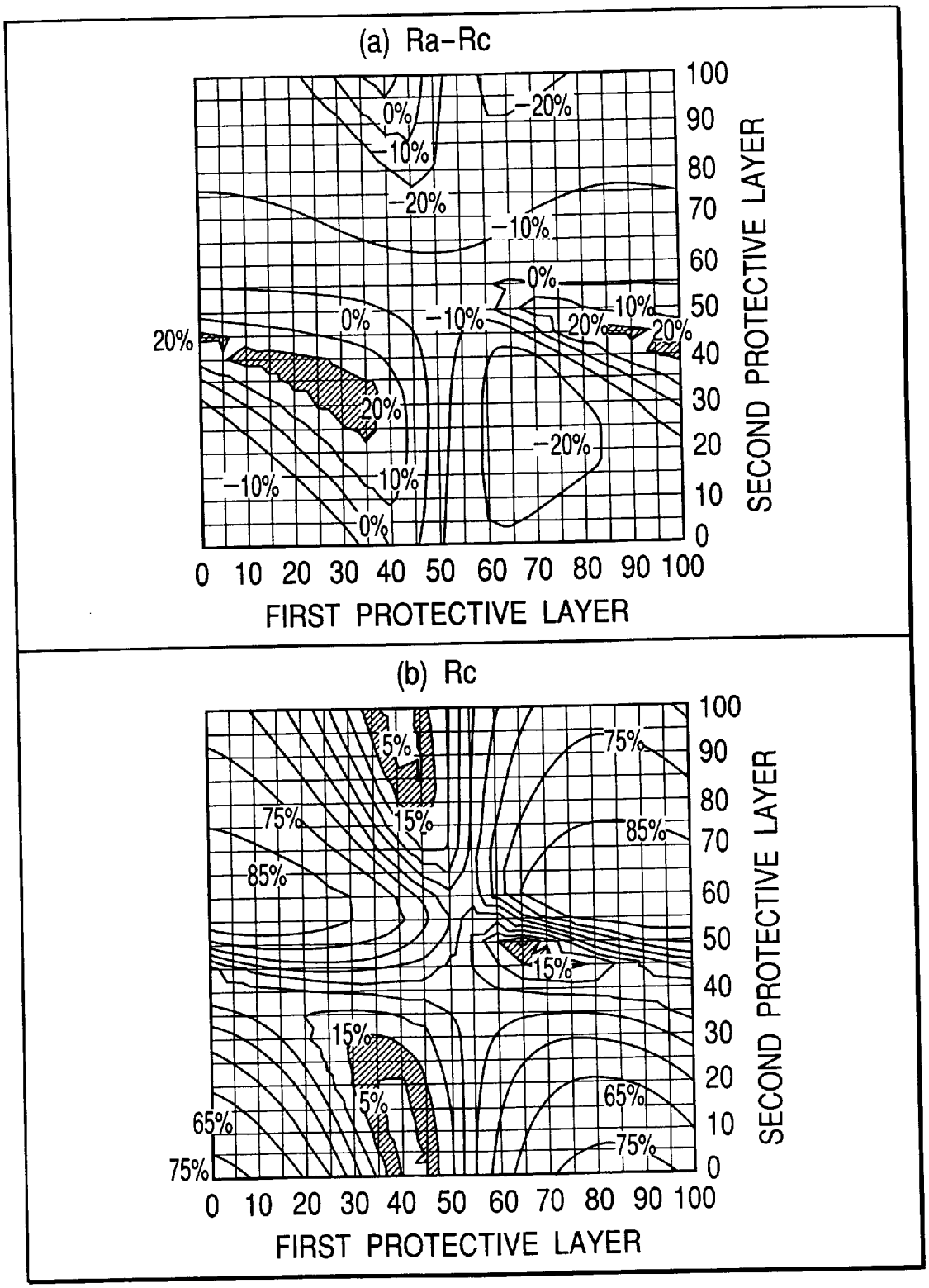
FIG. 22 is an example of optical calculations of Ra–Rc and Rc in Reference Example (3).
Figure 23:
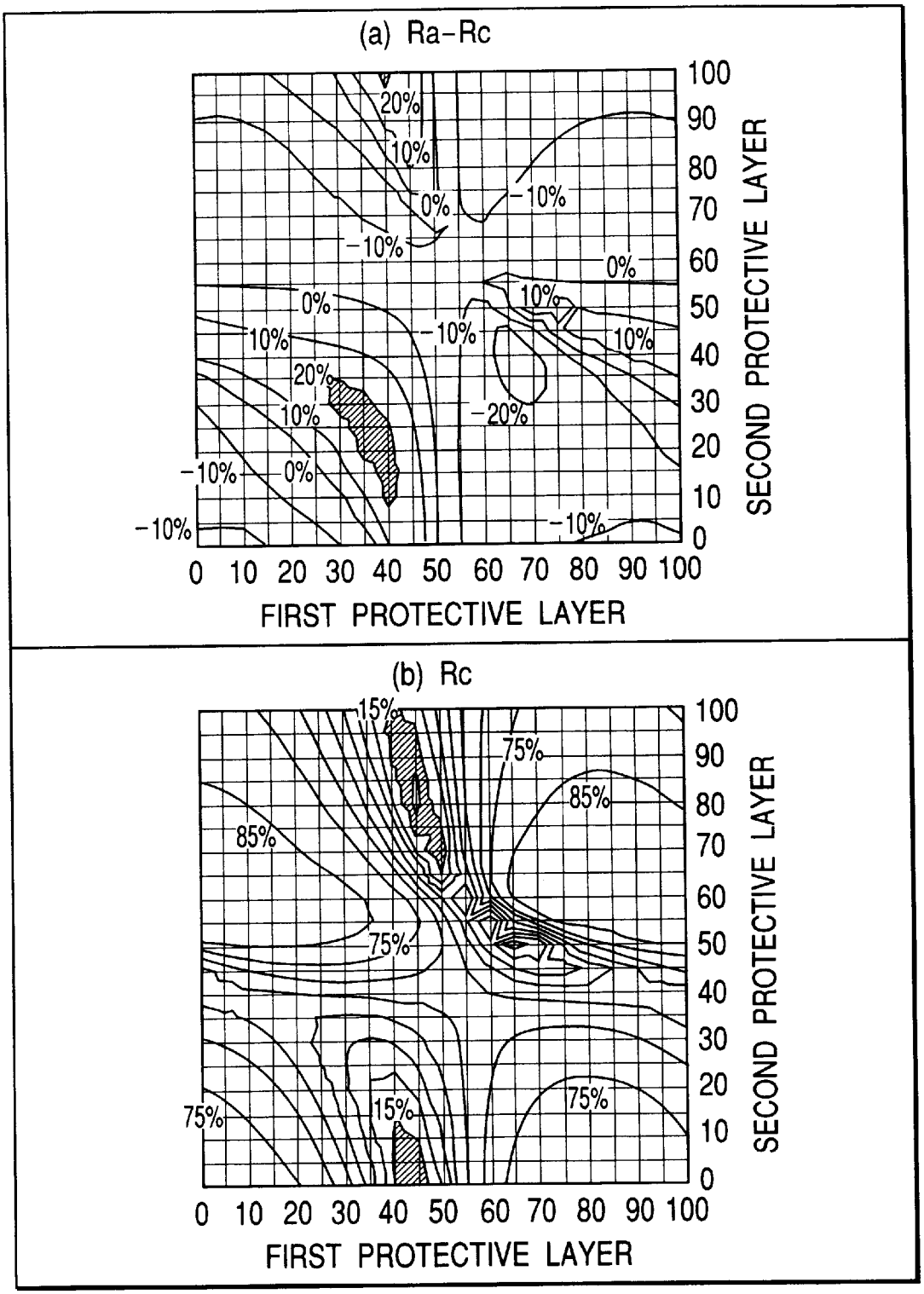
FIG. 23 is an example of optical calculations of Ra–Rc and Rc in Reference Example (3).
Figure 24:
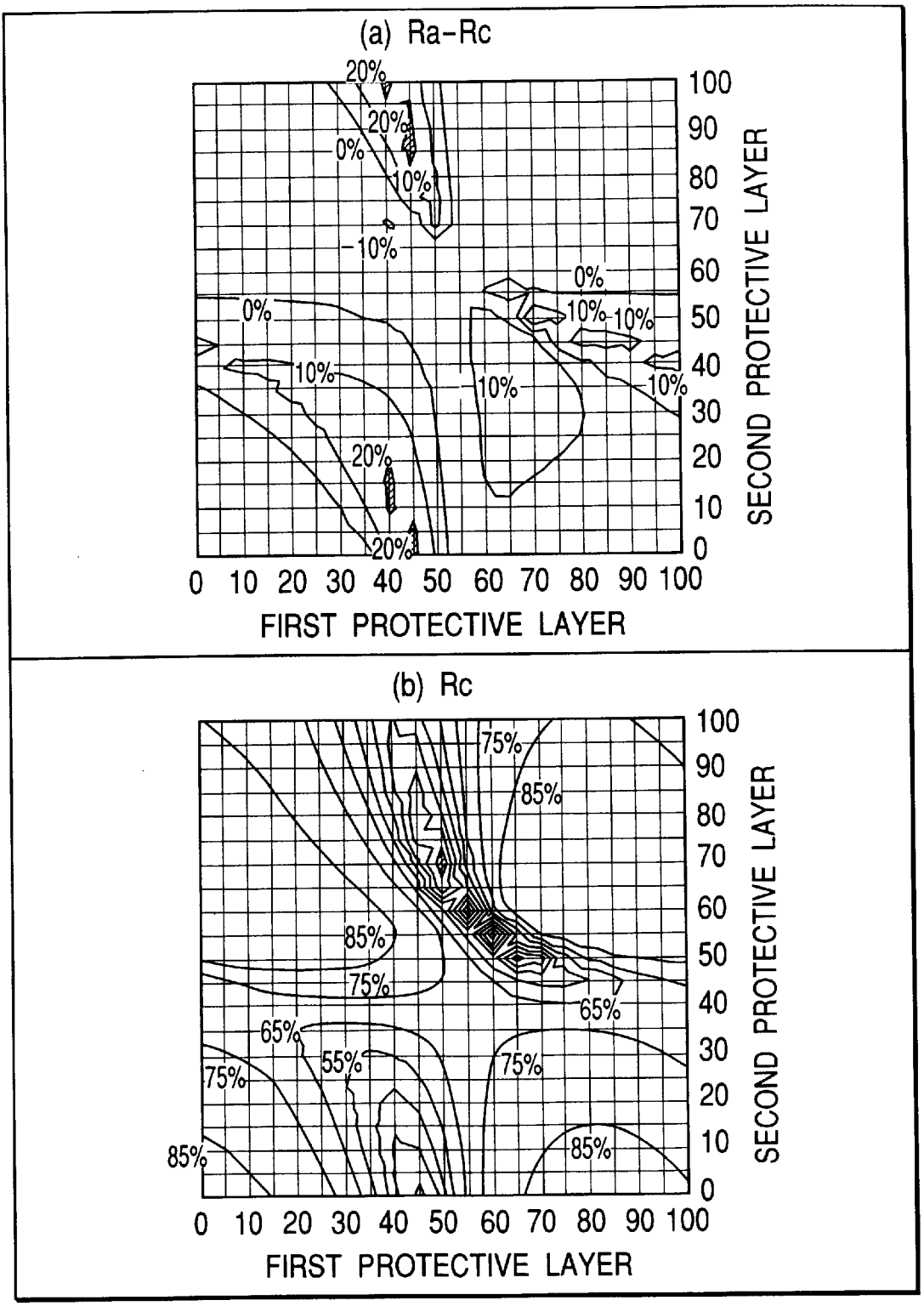
FIG. 24 is an example of optical calculations of Ra–Rc and Rc in Reference Example (3).
Figure 25:
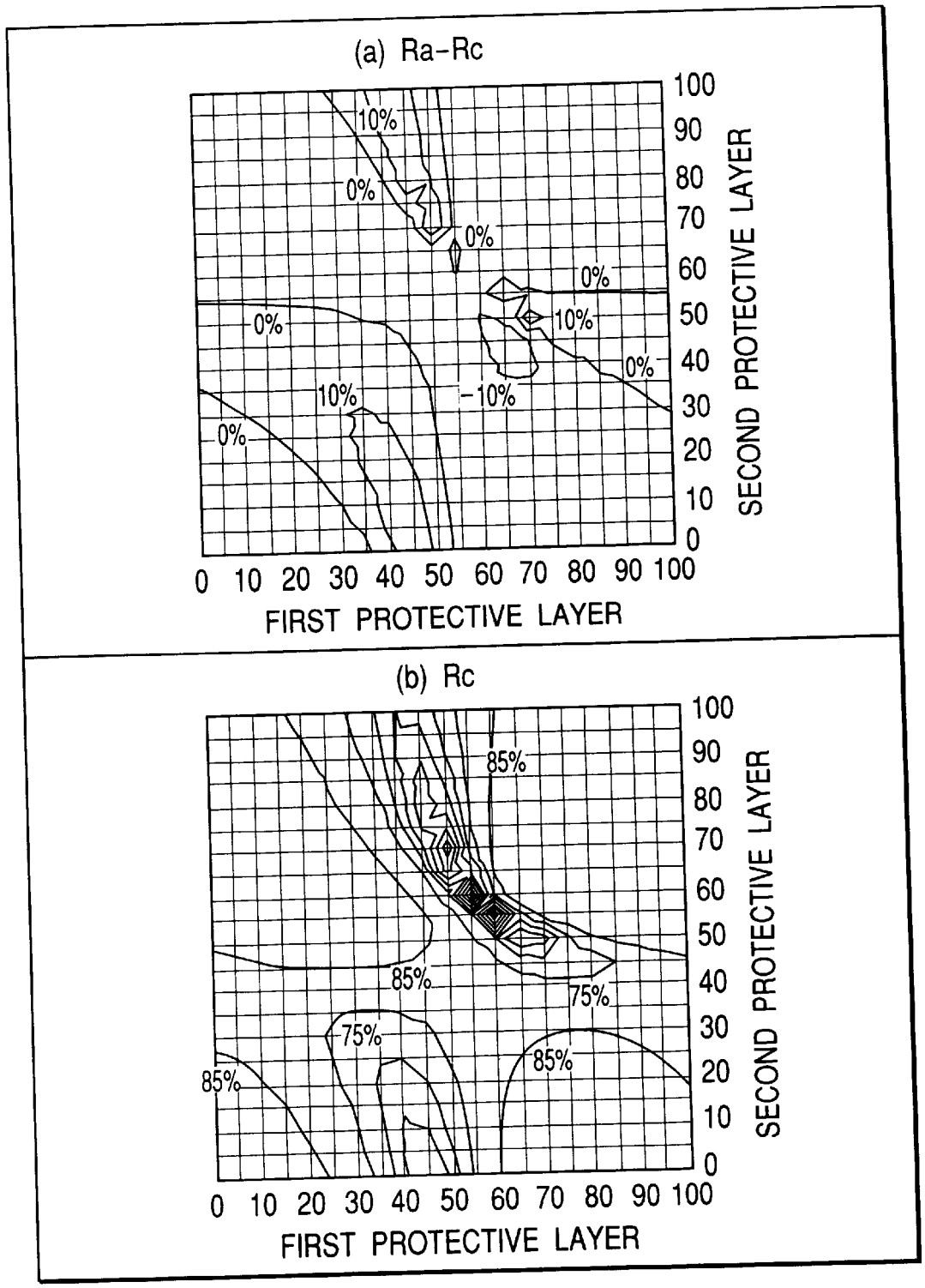
FIG. 25 is an example of optical calculations of Ra–Rc and Rc in Reference Example (3).

Further, the Au alloy was used to make the semi-transparent layer. The thickness of the semi-transparent layer was varied. Ra–Rc was obtained by optical calculations while varying the thicknesses of the first and second protective layers for each of the semi-transparent layer thicknesses. The results obtained are depicted in contours in FIG. 17. In the FIGS., (a), (b), (c), and (d) are cases of the semi-transparent layers with a thickness of 5, 10, 15 and 20 nm, respectively. The results of calculations obtained similarly but using the Cu alloy as the semi-transparent layer are shown in FIG. 18.

With the Au alloy semi-transparent layer or the Cu alloy semi-transparent layer, it is difficult to secure a high contrast.

(3) Ag Alloy semi-transparent layer/first protective layer/recording layer A/second protective layer/Ag alloy reflective layer (light was incident from the semi-transparent layer side; corresponding to the embodiment of the invention)

Ra–Rc and Rc of the layer structure were obtained through optical calculations, in which the thickness of the semi-transparent layer was varied, and the thicknesses of the first and second protective layers were varied for each semi-transparent layer thickness. The results obtained are depicted in contour lines in FIGS. 19 through 25, which correspond to the semi-transparent layer thicknesses of 5, 10, 15, 20, 30, 40, and 50 nm, respectively. In these FIGS., (a) and (b) represent Ra–Rc and Rc, respectively.

In each contour map, high-contrast regions generally exist in the second protective layer thickness range of from 30 to 50 nm. Regions providing Ra–Rc≧20% exist in the first protective layer thickness range of 0 to 40 nm. Regions providing 5≦Rc≦15(%) generally exist widely in the first protective layer thickness range of 25 to 45 nm. With the semi-transparent layer thickness being 30 nm or smaller, there are regions satisfying both of these conditions.

As the semi-transparent layer becomes thicker than 40 nm, the high-contrast regions are steeply narrowed.

Hardly is obtained a region giving Rc≦15 (%).

(4) Ag Alloy semi-transparent layer/(SiO$_2$ interdiffusion-protection layer)/sulfur-containing first protective layer/recording layer A/second protective layer/Ag alloy reflective layer (light was incident on the semi-transparent layer side)

Figure 26:
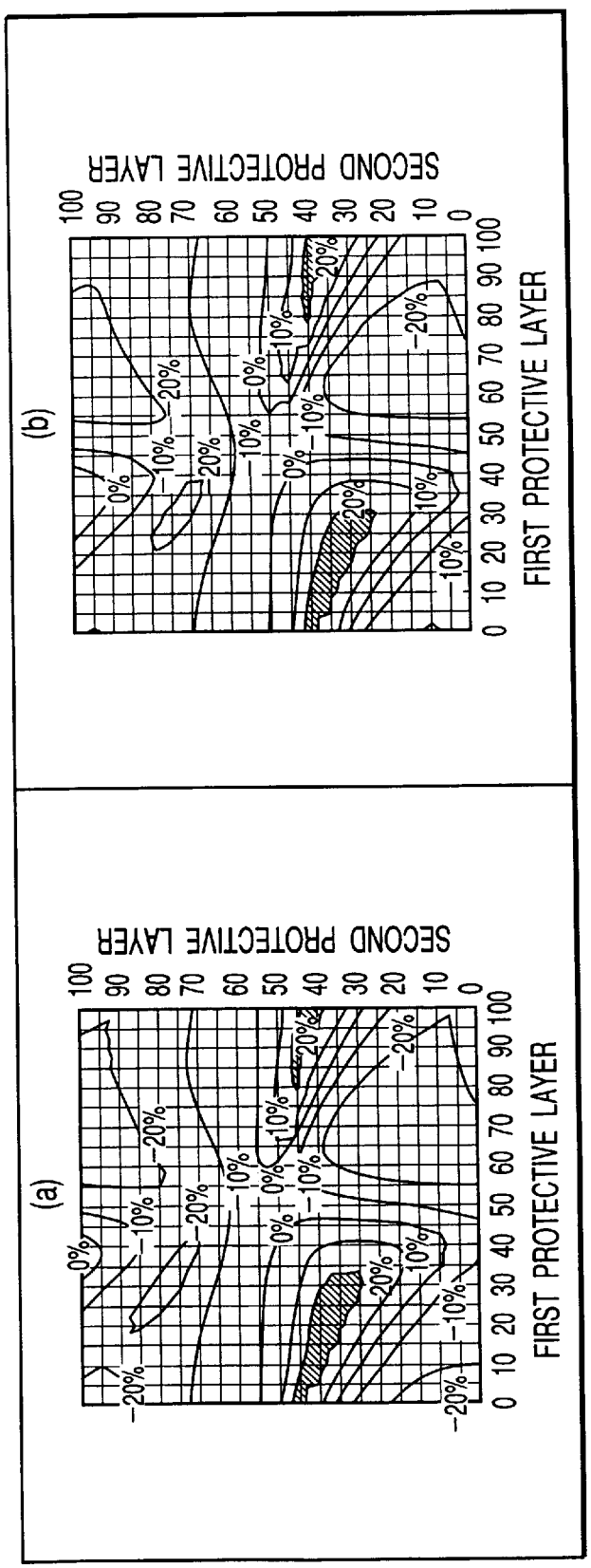
FIG. 26 is an example of optical calculations of Ra–Rc in Reference Example (4).

The thicknesses of the semi-transparent layer, the interdiffusion-protection layer, and the recording layer were set at 15 nm, 0 or 5 nm, and 12 nm, respectively. The thicknesses of the first and second protective layers were varied for each interdiffusion-protection layer thickness, and Ra–Rc for every thickness was obtained by optical calculations. The results obtained are shown in FIG. 26 as a contour map. FIG. 26(a) is of the interdiffusion-protection layer thickness of 0 nm, i.e., of the layer structure with no interdiffusion-protection layer, and FIG. 26(b) is of the interdiffusion-protection layer thickness of 5 nm (which corresponds to the embodiment of the invention). There is observed substantially no influence of the interdiffusion-protection layer on optical characteristics.

Industrial Applicability

Application of the layer structure according to the present invention to a phase-change optical recording medium brings improvements in terms of jitter, write power margin, deterioration of characteristics due to repeated overwriting, archival stability and the like compared with a recording medium having a conventional layer structure.

What is claimed is:

1. An optical recording medium comprising:
   a semitransparent layer mainly comprising Ag, a first protective layer comprising a dielectric, a phase-change recording layer made of an alloy mainly comprising Sb$_x$Te$_{1-x}$ (0.7<x≦0.9), a second protective layer comprising a dielectric, and a metallic reflective layer in this order,
   wherein said first protective layer comprises a sulfur-containing dielectric, the medium further has an interdiffusion-protection layer between said semi-transparent layer and said first protective layer, and
   the medium has a higher reflectance to light incident on said semi-transparent layer side when said recording layer is in an amorphous state than when said recording layer is in a crystalline state.

2. The optical recording medium according to claim 1, wherein said recording layer is made of an alloy mainly comprising (Sb$_x$Te$_{1-x}$)$_{1-y}$Ge$_y$(0.7<x≦0.9, 0<y≦0.1).

3. An optical recording medium comprising:
   a semitransparent layer mainly comprising Ag, a first protective layer comprising a dielectric, a phase-change recording layer, a second protective layer comprising a dielectric, and a metallic reflective layer in this order,
   wherein crystallization in said recording layer proceeds chiefly through crystalline growth from the boundaries between amorphous or molten areas and crystalline areas,
   where said first protective layer comprises a sulfur-containing dielectric, the medium further has an interdiffusion-protection layer between said semi-transparent layer and said first protective layer, and
   the medium has a higher reflectance to light incident on said semi-transparent layer side when said recording layer is in an amorphous state than when said recording layer is in a crystalline state.

4. The optical recording medium according to claim 1 or 3, wherein the reflectance Ra (%) of said medium when said recording layer is in an amorphous state and the reflectance Rc (%) of said medium when said recording layer is in a crystalline state satisfy the relationship: Ra–Rc≧15 (%).

5. The optical recording medium according to claim 1 or 3, wherein said semi-transparent layer has a thickness of 1 nm to 40 nm.

6. The optical recording medium according to claim 1 or 3, wherein said second protective layer has a thickness of 30 nm to 50 nm, and said first protective layer is thinner than said second protective layer.

7. The optical recording medium according to claim 1 or 3, wherein said metallic layer mainly comprises Ag.

8. The optical recording medium according to claim 7, wherein said medium has an interdiffusion-protection layer between said metallic reflective layer and said second protective layer where said second protective layer contains sulfur.

9. The optical recording medium according to claim 7, wherein:

said medium is for writing and retrieving with light having a wavelength of 350 nm and 450 nm, said first protective layer and said second protective layer are substantially transparent at said wavelength and have a refractive index of 2.0 to 2.4 at said wavelength, said semi-transparent layer has a thickness of 5 nm to 30 nm, said first protective layer has a thickness of 1 nm to 40 nm, said recording layer has a thickness of 5 nm to 20 nm, said second protective layer has a thickness of 30 nm to 50 nm, and said metallic reflective layer has a thickness of 40 nm to 100 nm.

10. The optical recording medium according to claim 1 or 3, wherein said semi-transparent layer has an Ag content of 90 atom % or higher.

11. The optical recording medium according to claim 10, wherein said semi-transparent layer has a volume resistivity of 20 nΩ·m to 100 nΩ·m.

12. The optical recording medium according to claim 7, wherein said metallic reflective layer has an Ag content of 90 atom % or higher.

13. The optical recording medium according to claim 12, wherein said metallic reflective layer has a volume resistivity of 20 nΩ·m to 100 nΩ·m.

14. The optical recording medium according to claim 1 or 3, wherein said medium further has a transparent coating layer having a thickness of 10 μm to 200 μm on said semi-transparent layer opposite to said first protective layer side, and a substrate on said metallic reflective layer opposite to said second protective layer side.

15. The optical recording medium according to claim 1, wherein the phase-change recording layer additionally contains at least one element selected from the group consisting of In, Ga, Si, Sn, Pb, Au, Pd, Pt, Zn, Zr, Hf, V, Nb, Ta, Cr, Co, Mo, Mn, Bi, O, N, S, Se, and the rare earth elements.

16. The optical recording medium according to claim 15, wherein the phase-change recording layer comprises $Ge_5In_3Sb_{68}Te_{24}$.

17. The optical recording medium according to claim 15, wherein the phase-change recording layer comprises $Ge_3In_5Sb_{67}Te_{25}$.

* * * * *